United States Patent
Kody et al.

(10) Patent No.: US 6,692,823 B2
(45) Date of Patent: Feb. 17, 2004

(54) MICROFIBRILLATED ARTICLES COMPRISING HYDROPHILLIC COMPONENT

(75) Inventors: Robert S. Kody, Minneapolis, MN (US); Mario A. Perez, Burnsville, MN (US); Thomas P. Klun, Lakeland, MN (US); Paul D. Graham, Woodbury, MN (US); Christopher K. Haas, Cottage Grove, MN (US); Ravi K. Sura, Woodbury, MN (US); Diane R. Wolk, Woodbury, MN (US); Julie S. Prudich, Woodbury, MN (US); Larry R. Krepski, White Bear Lake, MN (US); Terry R. Hobbs, Saint Paul, MN (US); John M. Sebastian, Maplewood, MN (US); Paul DeRoussel, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 9 days.

(21) Appl. No.: 10/027,713

(22) Filed: Dec. 19, 2001

(65) Prior Publication Data

US 2003/0138612 A1 Jul. 24, 2003

(51) Int. Cl.$^7$ ................................ B32B 5/16
(52) U.S. Cl. ................... 428/323; 428/304.4; 428/332; 428/359; 428/364
(58) Field of Search ............................ 442/339; 525/88, 525/240; 428/323, 332, 304.4, 333, 359, 364

(56) References Cited

U.S. PATENT DOCUMENTS

| | | | |
|---|---|---|---|
| 3,416,714 A | 12/1968 | Skinner | |
| 3,470,594 A | 10/1969 | Kim | |
| 3,470,685 A | 10/1969 | Hall et al. | |
| 3,473,206 A | 10/1969 | Boultinghouse | |
| 3,490,663 A | 1/1970 | Skinner | |
| 3,500,626 A | 3/1970 | Sandiford | |
| 3,542,632 A | 11/1970 | Eickhoff | |
| 3,549,470 A | 12/1970 | Greenwald et al. | |
| 3,565,985 A | 2/1971 | Schrenk et al. | |
| 3,576,931 A | 4/1971 | Chopra et al. | |
| 3,645,961 A | 2/1972 | Goldfein | |
| 3,695,025 A | * 10/1972 | Gibbon | |
| 3,719,540 A | 3/1973 | Hall | |
| 3,773,608 A | 11/1973 | Yoshimura et al. | |
| 3,893,957 A | 7/1975 | Mixon et al. | |
| 3,969,472 A | 7/1976 | Driscoll | |
| 4,134,951 A | 1/1979 | Dow et al. | |
| 4,348,350 A | 9/1982 | Meier et al. | |
| 4,377,616 A | 3/1983 | Ashcraft et al. | |
| 4,536,361 A | 8/1985 | Torobin | |
| 4,565,840 A | 1/1986 | Kobayashi et al. | |
| 4,595,738 A | 6/1986 | Hufnagel et al. | |
| H90 H | 7/1986 | Kumar | |
| 4,701,369 A | 10/1987 | Duncan | |
| 4,701,370 A | 10/1987 | Park | |

(List continued on next page.)

FOREIGN PATENT DOCUMENTS

| | | |
|---|---|---|
| DE | 19840991 A1 | 3/2000 |
| EP | 0 488 577 B1 | 11/1993 |
| EP | 0 806 512 A1 | 11/1997 |
| GB | 1073741 | 6/1967 |
| GB | 1157695 | 7/1969 |
| GB | 1171543 | 11/1969 |
| GB | 1 234 782 | 6/1971 |
| GB | 1 267 298 | 3/1972 |
| GB | 1 541 681 | 3/1979 |
| GB | 2 034 243 A | 6/1980 |
| GB | 2 061 281 B | 5/1981 |
| GB | 1 605 004 | 12/1981 |
| JP | 51-29191 | 8/1976 |
| JP | 51-33152 | 9/1976 |

(List continued on next page.)

OTHER PUBLICATIONS

"Survey of Polymer Morphology", pp. 149–177.

"Thin Films (Film Formation Techniques)", Encyclopedia of Chemical Technology, (4$^{th}$ ed.), 1997 pp. 1040–1076, vol. 23.

Affinito et al., "Polymer/Polymer, Polymer/Oxide, and Polymer/Metal Vacuum Deposited Interference Filters", Proc. of the 10 International Conf. on Vacuum Coating, 1996, pp. 207–220.

Barham et al., "A Study on the Achievement of High–Modulus Polyethylene Fibres by Drawing", Journal of Materials Science, (1976), pp. 27–35, vol. 11.

Bigg, "Mechanical Property Enhancement of Semicrystalline Polymers", Polymer Engineering and Science, Jul. 1988, pp. 830–841, vol. 28, No. 13.

Capaccio et al., "Effect of Molecular Weight on the Morphology and Drawing Behaviour of Melt Crystallized Linear Polyethylene", Polymer, (Apr. 1975), pp. 239–243, vol. 16.

Davies, "The Separation of Airborne Dust and Particles", The Institution of Mechanical Engineers, London, Proceedings 1B, 1952.

Encyclopedia of Polymer Science and Engineering, "Emulsion Polymerization to Fibers, Manufacture", (1986), pp. 830–831, vol. 6.

Encyclopedia of Polymer Science and Engineering, "Emulsion Polymerization to Fibers, Manufacture", (1986), pp. 648, 649, 806–821, vol. 6, 2$^{nd}$ Ed.

(List continued on next page.)

Primary Examiner—Merrick Dixon
(74) Attorney, Agent, or Firm—Kent S. Kokko

(57) ABSTRACT

Described are hydrophilic fibrillated articles that include melt-processable polymer and hydrophilic component such as hydrophilic surfactant or hydrophilic polymer, as well as methods of preparing such articles.

27 Claims, No Drawings

U.S. PATENT DOCUMENTS

| | | |
|---|---|---|
| 4,867,937 A | 9/1989 | Li et al. |
| 4,916,198 A | 4/1990 | Scheve et al. |
| 4,921,652 A | 5/1990 | Tsuji et al. |
| 4,940,736 A | 7/1990 | Alteepping et al. |
| 4,965,123 A | 10/1990 | Swan et al. |
| 4,973,517 A | 11/1990 | Lammers et al. |
| 5,032,460 A | 7/1991 | Kantner et al. |
| 5,043,197 A | 8/1991 | Renalls |
| 5,049,347 A | 9/1991 | Magill et al. |
| 5,160,674 A | 11/1992 | Colton et al. |
| 5,236,963 A | 8/1993 | Jacoby et al. |
| 5,258,220 A | 11/1993 | Joseph |
| 5,300,357 A | 4/1994 | Gardiner |
| 5,330,827 A | 7/1994 | Hansen |
| 5,338,357 A | 8/1994 | Takai et al. |
| 5,366,804 A | 11/1994 | Dugan |
| 5,378,537 A | 1/1995 | Masuda et al. |
| 5,422,175 A | 6/1995 | Ito et al. |
| 5,434,002 A | 7/1995 | Yoon et al. |
| 5,456,752 A | 10/1995 | Hogan |
| 5,589,264 A | 12/1996 | Yoon et al. |
| 5,594,070 A | 1/1997 | Jacoby et al. |
| 5,698,489 A | 12/1997 | Shirai et al. |
| 5,770,144 A | 6/1998 | James et al. |
| 5,783,503 A | 7/1998 | Gillespie et al. |
| 5,804,625 A | 9/1998 | Temperante et al. |
| 5,807,516 A | 9/1998 | Wolstenholme et al. |
| 5,811,493 A | 9/1998 | Kent |
| 5,845,355 A | 12/1998 | Strahm |
| 5,861,213 A | 1/1999 | Ohmory et al. |
| 5,908,598 A | 6/1999 | Rousseau et al. |
| 5,945,215 A | 8/1999 | Bersted et al. |
| 5,945,221 A | 8/1999 | Tsai et al. |
| 6,013,587 A | 1/2000 | Truong et al. |
| 6,071,266 A | 6/2000 | Kelley |
| 6,110,588 A | 8/2000 | Perez et al. |
| 6,124,058 A | 9/2000 | Ohmory et al. |
| 6,255,403 B1 | 7/2001 | Andrist et al. |
| 6,331,343 B1 | 12/2001 | Perez et al. |
| 6,333,433 B1 | 12/2001 | Banerjee et al. |
| 2001/0031594 A1 | 10/2001 | Perez et al. |
| 2002/0025442 A1 | 2/2002 | Chang et al. |

FOREIGN PATENT DOCUMENTS

| | | |
|---|---|---|
| JP | 61-258060 | 11/1986 |
| JP | 63-85154 | 4/1988 |
| JP | 4-194068 | 7/1992 |
| JP | 02 672188 | 11/1997 |
| JP | 2000-256934 A | 9/2000 |
| WO | WO 95/33882 | 12/1995 |
| WO | WO 97/44508 | 11/1997 |
| WO | WO 97/49326 | 12/1997 |
| WO | WO 99/06622 | 2/1999 |
| WO | WO 99/06623 | 2/1999 |
| WO | WO 99/61520 | 12/1999 |
| WO | WO 00/46435 | 8/2000 |
| WO | WO 00/68301 | 11/2000 |
| WO | WO71789 | * 11/2000 |

OTHER PUBLICATIONS

Encyclopedia of Polymer Science and Engineering, "Identification to Lignin", (1987), pp. 685–688, vol. 8.

Encyclopedia of Polymer Science and Engineering, "Peroxy Compounds to Polyesters", (1988), pp. 433–434, vol. 11.

Essentials of Textiles, Holt, Rinehart and Winston, Inc., 4$^{th}$ Ed., "Other Fabric–Construction Processes", pp. 235–238.

Karger–Kocsis,"Polypropylene: Structure, Blends and Composites", 1994, pp. 116–139, vol. 1.

Macknight et al. "Polymer Blends", pp. 428–435, Chapter 12, vol. 12.

Porter et al., "Uniaxial Extension and Order Development in Flexible Chain Polymers", Journal of Macromolecular Science–Rev. Macromol. Chem. Phys., C35(a), 1995, pp. 63–115.

The 29$^{th}$ Clemson Nonwoven Fabrics Forum, Jun. 22–25, 1998, pp. 1–16.

The Nonwoven Fabrics Handbook, pp. 59–62, 87–88, 98.

* cited by examiner

MICROFIBRILLATED ARTICLES COMPRISING HYDROPHILLIC COMPONENT

The invention relates to hydrophilic microfibrillated articles; hydrophilic microfibers and microflakes; and methods of preparing each. The microfibrillated articles exhibit hydrophilic properties and wettability, and can be incorporated into or used as a large variety of useful products, such as water-absorbing wipes, mops, mats, tape backings, filters, fabrics, fabric replacements, and nearly any variety of other useful industrial and commercial products where hydrophilicity is desired.

BACKGROUND

Materials that can be processed to form microfiber-bearing surfaces have been identified, including oriented polypropylene. See, e.g., U.S. Pat. No. 6,110,588. Microfibrillatable materials of U.S. Pat. No. 6,110,588 can be prepared from certain materials and processed using various techniques to produce oriented films capable of being microfibrillated. Microfibrillation of these oriented films results in, e.g., a microfiber-bearing surface, the microfiber being a specific size and shape.

Fibrillated (e.g., microfibrillated) surfaces and articles exhibit a variety of uses, by themselves or in combination with other materials that may or may not include a fibrillated surface. For example, certain fibrillated articles can be used as a wipe, a wrap, a backing, a fabric, a filter, etc. In some of these applications, it can be desirable to select a fibrillated surface that exhibits a physical or chemical property suited for a particular application. For instance, it can be useful in certain applications to select a fibrillated surface that includes any one or more of hydrophilic, hydrophobic, oleophilic, oleophobic, inert or stain resistant, electrostatically chargeable material, etc.

Certain melt-processable polymers that can be used to prepare microfibrillatable and microfibrillated materials are not especially hydrophilic. Polyolefins such as polypropylene, for example, and other similar polymeric materials useful in forming microfibrillated surfaces, are generally not hydrophilic due to their non-polar nature. Thus, it would be desirable to identify methods or materials that could be used to improve the hydrophilicity of such melt-processable polymers useful in forming microfibrillated surfaces. It can be unpredictable, however, whether or not the chemistry of melt-processable materials and hydrophilic materials will allow the hydrophilic material to be incorporated into and retained within a melt-processable polymer, through processing of the melt-processable polymer en route to a microfibrillated surface. As a single example, certain water-soluble hydrophilic surfactants or hydrophilic polymers may be expected to be washed away or dissolved during hydroentanglement or other microfibrillation processes, and therefore may not be expected to remain with a microfibrillated article to improve hydrophilicity.

Furthermore, in preparing a microfibrillated article, selection of ingredients can be important to succeed in producing a fibrillated surface. A typical method of preparing a microfibrillated article includes: selecting a polymer that is capable of being melt-processed to form a fibrillated surface such as a film; melt-processing the film so that the film is capable of being fibrillated, such as by stretching, orienting, lengthening, etc.; and microfibrillating, e.g., hydroentangling, the film to disrupt the surface of the film in a manner to form a microfibrillated surface. Each of the steps must be performed, and the materials of the film must be selected, with the design of providing an extruded, oriented film that has a morphology and mechanical and chemical makeup to allow the film to be processed to a microfibrillated surface.

While various additives might be thought to be generally useful if added to a melt-processable or microfibrillatable polymer useful to prepare a microfibrillated article, a balance of morphology, e.g., crystallinity, and other properties such as the presence and concentration of voids, molecular orientation, polymeric strength, etc., is required to extract a microfibrillated surface from a melt-processable polymeric material. Any additive material included in a polymer or polymeric film being processed to form a microfibrillated article has the potential to detrimentally affect the ability of the film material to be processed to a microfibrillated surface. For example, an additive may frustrate the ability of a polymer to be melt-processed (e.g., extruded), calendered and/or length oriented, or microfibrillated. The additive may, for example, prevent a useful mixture from being formed by melt-processing; weaken the composition of a melt-processed polymeric material, preventing processing such as orientation, stretching, or calendering, etc.; or may allow melt-processing and orienting, but may have the effect of frustrating microfibrillation, e.g., by not allowing the formation of voids, or by otherwise disturbing the morphology, crystallinity, or other physical features necessary in a film to allow microfibrillation.

New and different microfibrillated articles and methods for their preparation are always desirable. In particular, there continues to be a need for microfibrillated articles that exhibit improved properties such as improved wettability or hydrophilicity.

SUMMARY OF THE INVENTION

The invention relates to hydrophilic microfibrillated microflake or microfiber articles and their preparation. The microflakes or microfibers can be prepared by including a hydrophilic component with a melt-processable polymer, in appropriate amounts, so that the melt-processable mixture of melt-processable polymer and hydrophilic material may be processed to be microfibrillated to form microflakes or microfibers.

According to the invention, a hydrophilic component can be included in a melt-processable polymer in an amount that will improve the hydrophilicity of the material, but will at the same time not prevent the material from being melt-processed to form a film, followed by other necessary processing to form a microfibrillated microfiber or microflake surface.

The invention can be accomplished using any of a variety of melt-processable polymers capable of being processed to form microflakes or microfibers. Certain important examples include polyolefins such as polyethylene, polypropylene, polyester, and their mixtures, but many others as well, with or without additional ingredients such as a void initiating agent or blowing agent.

The invention can be accomplished using any of a variety of hydrophilic components combined with the melt-processable polymer in an amount that will still allow a variety of processing steps that result in a microfibrillated surface. Important examples include certain hydrophilic polymers and certain hydrophilic surfactants, particularly nonionic hydrophilic surfactants.

As used herein, "hydrophilic," "hydrophilicity," and similar terms are used to describe materials that can be wet by water, by aqueous solutions of acids and bases (e.g., aqueous potassium hydroxide), by polar liquids (e.g. sulfuric acid and ethylene glycol), or combinations thereof. (See, U.S. Pat. No. 5,804,625). In certain preferred embodiments of the invention, microfibrillated microflake or microfiber articles can be sufficiently hydrophilic to about 5 or 10 grams of water per gram of microfibrillated article. Other embodiments of microfibrillated articles of the invention can be sufficiently hydrophilic to have the ability to increase the amount of absorbed water at least 30% and up to 1000% or more, e.g., 200%, compared with the same article without the hydrophilic component.

Thus, an aspect of the invention relates to a hydrophilic microfibrillated article that includes an oriented melt-processed polymeric material, wherein the polymeric material includes a melt-processed polymer that is a polypropylene, a polyethylene, or a mixture thereof, and hydrophilic component preferably in an amount effective to improve the hydrophilicity of the microfibrillated article.

Another aspect of the invention relates to a hydrophilic article that includes an oriented melt-processed polymeric material, and the polymeric material contains high melt strength polypropylene and hydrophilic component.

Yet another aspect of the invention relates to a hydrophilic microfibrillated article containing oriented melt-processed polymeric material, wherein the polymeric material includes melt-processed polymer and hydrophilic surfactant.

Yet another aspect of the invention relates to a hydrophilic microfibrillated article including oriented melt-processed polymeric material, wherein the polymeric material contains melt-processed polymer and hydrophilic polymer, and the hydrophilic polymer is selected from a sulfonated polyester and a polyvinylpyrrolidone.

Yet another aspect of the invention relates to a method of preparing a hydrophilic microfibrillated article. The method includes extruding a mixture of melt-processable polymer and hydrophilic component to form a film, orienting the film to form a microfibrillatable material, and microfibrillating the microfibrillatable material to form a hydrophilic microfibrillated article.

DETAILED DESCRIPTION

The invention relates to preparing microfibrillated articles that include hydrophilic microfibrillated microflakes or microfibers. The microfibrillated articles are generally prepared from a melt-processable combination of ingredients that include a melt-processable polymer and a hydrophilic component. The hydrophilic component may or may not be melt-processable on its own.

The microfibrillated articles are prepared from selected materials, typically in the form of a melt-processed polymer converted to a polymeric film that can be microfibrillated to form a fragmented piece of the film in the form of a microfiber or microflake. Such microfiber or microflake-forming materials are referred to herein as "microfibrillatable materials."

As used herein, the terms "microflake or microfiber article" and "microfibrillated article" refer to microfibrillated materials that have a surface structure that includes a microfiber or a microflake, or a similarly-sized and shaped surface structure created by microfibrillation. One type of such structure, a microfiber, is understood to have size and shape characteristics including an effective diameter less than 20 microns and a transverse aspect ratio from 1.5:1 to 20:1, a cross-sectional area of about $0.5\mu^2$ to about $3.0\mu^2$, and can provides a preferred surface with a surface area of 0.5 to 30 square meters per gram. Another type of microfibrillated structure, a microfibrillated microflake or "microflake," is understood to comprise a schistose structure. In this structure, the microflakes, which tend to be generally parallel to one another, are shaped like a plate or a plate-like ribbon where the length scale of two of the microflake dimensions is at least 10 times, preferably at least 20 times, the length scale of the microflake's third dimension. The microflakes typically can have an average length or thickness of less than 20 micrometers, preferably less than about 5 micrometers, more preferably about 1 to about 3 micrometers. The microflakes can have an average width of less than about 200 micrometers, preferably less than about 80 micrometers, more preferably about 5 to about 30 microns. The aspect ratio of the surface of microflakes may range from, e.g., 1:1 to 1:20, and can depend on how balanced the orientation is. A more unbalanced stretch leads to a more tape-like microflake. The flakes can be connected to one another and tend to be continuous in a width or length direction. Dimensions can be measured using a scanning electron microscope.

Examples of microflake and microfiber structures are described in Assignee's copending patent applications U.S. Ser. No. 09/602,978, "Fibrillated Article and Method of Making," filed on Jun. 23, 2000; U.S. Ser. No. 09/858,253, filed on May 15, 2001, entitled "Fiber Films and Articles from Microlayer Substrates"; and also in U.S. Pat. Nos. 6,110,588, and 6,333,433 all of which are incorporated herein by reference.

The terms microflake and microfiber do not include electret fiber materials as described in a U.S. Pat. No. Re. 30,782, which are prepared by mechanical fibrillation through the entire thickness of an oriented film to form fibers. Characterization of one example of fibers prepared according to Re. No. 30,782 revealed fiber dimensions of 10 micrometers thick by 40 micrometers wide, with an effective diameter of 25 micrometers.

Microfibrillatable materials include a variety of melt-processable or polymers or melt-processed polymeric films that can be further processed by microfibrillation to form microfibers or microflakes. In general, microfibrillatable materials that can be microfibrillated to form microfibers or microflakes include materials capable of being processed by mechanical or other action, especially by microfibrillation with a fluid, to cause a breaking, splitting, or other form of fragmenting or disruption of the material to form a microfiber or microflake on or from a surface of the material. Important representative examples of microfibrillatable materials include extruded, oriented, polymeric film materials having proper morphology to allow microfibrillation to a microflake or microfiber, especially by hydroentangling techniques.

Microfibrillatable materials are typically made of melt-processed polymeric materials having a structure or morphology that includes at least one feature that upon mechanical contact will cause a microflake or microfiber to be formed from the polymeric film, typically including proper orientation of the polymeric material. Properties of a film that facilitate formation of flakes or microfibers can include: structural features such as voids, microvoids, or other disturbances in the polymer; orientation of the film, e.g., biaxial or uniaxial orientation; multiple layers, especially where an interface at surfaces of different layers weakens the internal structure of a multi-layer film, or where the films are extremely thin such as "microlayer films"; and morphology, such as crystallinity. Proper orientation can be present alone in a film to allow microfibrillation. Alternatively, orientation and one or more other of these different features can be present in combination. When combinations of different properties are present, the amount or severity of one or both properties may be reduced relative to the amount or severity of that property that would be necessary to allow fibrillation if only that single property were present.

Polymers useful in preparing hydrophilic microflakes or microfibers of the invention include a variety of different melt-processable polymeric materials and mixtures and blends of different polymeric materials. An important example of a useful class of melt-processable polymers is polyolefins, including polyethylenes and polypropylenes, specifically including isotactic polypropylene, syndiotactic polypropylene, mixtures of isotactic, atactic and/or syndiotactic polypropylene, and mixtures of any one of these with another melt-processable polymer.

Properties that may facilitate microfibrillation can be created in a film during processing of the film. In general, the described properties and combinations of the properties can be produced in a polymeric film by selecting one or more of the following: composition of the polymeric material; processing conditions, e.g., processing conditions during extrusion or co-extrusion of a melt-processable polymeric mixture; multiple layers of a film, e.g., a microlayer film; processing conditions after extrusion or co-extrusion, possibly including individual steps or combinations of steps such as casting, quenching, annealing, calendering, orienting, solid-state drawing, roll-trusion, and the like.

Polymeric films typically comprise long molecular chains having a backbone of carbon atoms. The ability to microfibrillate a surface of a polymeric film is often not realized due to random orientation and entanglement of the individual polymer chains. As one method of facilitating microfibrillation, polymer chains can be oriented to be relatively more parallel to one another and partially disentangled. The degree of molecular orientation can be defined in terms of a draw ratio, which is the ratio of a final length to an original length. Orientation may be effected by a combination of techniques, including the steps of calendering and length orienting.

Microfibrillation of polymeric films can be facilitated by orientation of the film, including either bi-axial or uni-axial orientation. Bi-axial orientation means that a film is substantially lengthened or stretched in two directions. Uni-axial orientation means that a film is lengthened or stretched in one direction relatively more than it is stretched in another, e.g., perpendicular direction. By exemplary methods, a film can be stretched in a machine direction while its width is not held, and the film gets longer in length, thinner, and narrower in width. In another exemplary method, the width may be held constant while the length is stretched. In other words, sufficient orientation may be achieved for microfibrillation by inducing a relatively greater amount of orientation in one direction, e.g., the machine direction, compared to a lesser degree of orientation in another direction, especially a perpendicular direction, such as the cross direction.

Crystallinity also can affect the ability of a film, particularly a uniaxially oriented film, to be microfibrillatable. A variety of semi-crystalline, crystalline, and highly-crystalline materials can be processed to be microfibrillatable and able to be processed to form microfibers or microflakes. Examples of polymeric materials for forming microfibrillatable films can include semicrystalline melt-processed films having a maximized crystallinity induced in the polymeric film layer by an optimal combination of casting and subsequent processing such as calendering, annealing, stretching, and recrystallizing. For polypropylene, as an example, preferred crystallinity can be above 60%, preferably above 70%, most preferably above 75%. The crystallinity may be measured by differential scanning calorimetry (DSC) and comparison with extrapolated values for 100% crystalline polymers. See, e.g., B. Wunderlich, Thermal Analysis, Academic Press, Boston, Mass., 1990.

Microflake and microfiber-forming microfibrillatable materials and films also may contain spherulites and microvoids to facilitate fibrillation. See, e.g., U.S. Pat. No. 6,110, 588.

Any suitable combination of polymer film composition and processing steps and conditions may be used to impart sufficient orientation and microscopic structure, e.g., crystallinity, voids or microvoids, spherulites, multiple layers, microlayers, etc., to produce a microfibrillatable material such as a film or layer of a multi-layer film that can be microfibrillated to form microflakes or microfibers. These conditions may include combinations of casting, quenching, annealing, calendering, orienting, solid-state drawing, roll-trusion, and the like.

Some specific examples of melt-processable materials that can be used to prepare a microfibrillatable material layer are discussed in U.S. Pat. No. 6,110,588. Exemplary semi-crystalline polymers include high and low density polyethylene, polyoxymethylene, polypropylene, poly (vinylidine fluoride), poly(methyl pentene), poly(ethylene-chlorotrifluoroethylene), poly(vinyl fluoride), poly(ethylene terephthalate), poly(butylene terephthalate), nylon 6, nylon 66, polybutene, and thermotropic liquid crystal polymers, blends of any one or more of these polymers with another of these or another polymer or a copolymer made from any of the listed monomers and any other listed monomer or a different monomer. Important examples of useful polymers include polyolefins such as polypropylene and polyethylene which are readily available at low cost and can provide highly desirable properties in microfibrillated articles such as high modulus and high tensile strength.

The molecular weight of the polymer can be chosen so that the polymer is melt-processable (i.e., extrudable or co-extrudable) under the processing conditions used in extrusion and co-extrusion, and in combination with a useful amount of the hydrophilic component. For polypropylene and polyethylene, for example, the molecular weight may be from about 5,000 to 499,000 and is preferably from about 100,000 to 300,000.

Still referring to the '588 patent, it describes that any suitable combination of processing conditions may be used to impart crystallinity and orientation to a melt-processed film. Starting with a melt-processed, cast film, for example, the film may be calendered, stretched, oriented, cast, quenched, annealed, drawn, roll-truded, etc. Such processing generally serves to increase the degree of crystallinity of the polymer film as well as the size and number of spherulites.

The '588 patent describes additional details and recites examples of preferred embodiments of materials and techniques, and optional processing steps, that may be used to prepare useful microfibrillatable materials. That description along with the present disclosure and knowledge available to a skilled artisan will enable the preparation of films and articles described herein.

Another class of microfibrillatable materials that can be used according to the invention includes foamed and oriented polymers, preferably thermoplastic polymers. The foam may be made using extrusion processing, for example, by adding one or more polymers and gas or supercritical fluid (SCF) to a twin-screw (TSE) or single-screw extruder (SSE). One way to add gas to the polymer stream is to use a chemical blowing agent (CBA) such as azodicarbonamide or a sodium bicarbonate/citric acid blend. The CBA degrades at elevated temperatures, generating gas either through decomposition or reaction. Another way to add gas to the polymer stream is to use a physical blowing agent (PBA) such as carbon dioxide, nitrogen, or pentane. The gas or SCF and polymer are thoroughly mixed, preferably into a one-phase mixture, at elevated pressure. When the resulting mixture exits the extruder, the polymer is foamed, and the resulting extruded foam typically has a density that is about twenty to eighty percent less than the neat unfoamed polymer.

The foamed polymer is then uniaxially or biaxially oriented. To uniaxially orient the foamed polymer, the foam is fed into a length orienter (LO) and oriented to between about 2 and 12 times the original length. To orient foams in a biaxial manner, an LO combined with a tenter may be used to sequentially orient the foam in the machine and transverse directions. Similarly, simultaneous biaxial orientation equipment, such as a tenter with accelerating clips, can be used to generate more isotropic oriented foams. The orientation process can raise or lower the density of the foam, depending on process conditions. However, the oriented foam typically has a density of about twenty to eighty percent less than the neat unfoamed polymer. Generally, lower density foams have higher void content, which increases the rate of microfibrillation.

While oriented foams can be generated in a variety of processes, preferably the foams can be made in a manner similar to that described in Assignee's copending patent application U.S. Ser. No. 09/602,032, "Foam and Method of Making," filed on Jun. 21, 2001, and incorporated herein by reference. The foams created using the process and materials described therein feature much smaller cell sizes than conventional foams, thus providing a more visually appealing, more uniform, and more microfibrillatable material.

See also Assignee's copending patent application U.S. Ser. No. 09/602,978, "Fibrillated Article and Method of Making," filed on Jun. 23, 2000, incorporated herein by reference, disclosing fibrillated materials made from foamed and oriented high melt strength polypropylenes, which are useful polymers for making foams according to the present invention. High melt strength polypropylenes are considered to include polypropylenes having melt strengths in the range of 25 to 60 cN at 190° C. Melt strength may be measured using an extensional rheometer by extruding the polymer through a 2.1 mm diameter capillary having a length of 41.9 mm at 190° C. and at a rate of 0.030 cc/sec; the strand is then stretched at a constant rate while measuring the force. Preferably the melt strength of a high melt strength polypropylene can be in the range of 30 to 55 cN, as described in WO 99/61520, the entirety of that disclosure being incorporated herein by reference. Examples of typical high melt strength polypropylenes include branched polypropylenes. The polypropylenes may be homopolymers or copolymers, with co-monomers including ethylene.

Exemplary high melt strength foamable polypropylenes may consist of propylene homopolymers or may comprise a copolymer having 50 wt % or more propylene monomer content. The foamable polypropylene may comprise a mixture or blend of propylene homopolymers or copolymers with a homo- or copolymer other than propylene homo- or copolymers.

Particularly useful high melt strength propylene copolymers are those of propylene and one or more non-propylenic monomers. Propylene copolymers include random, block, and graft copolymers of propylene and olefin monomers selected from the group consisting of C3–C8 α-olefins and C4–C10 dienes. Propylene copolymers may also include terpolymers of propylene and α-olefins selected from the group consisting of C3–C8 α-olefins, wherein the α-olefin content of such terpolymers is preferably less the 45 wt %. The C3–C8 α-olefins include 1-butene, isobutylene, 1-pentene, 3-menthyl-1-butene, 1-hexene, 3,4-dimethyl-1-butene, 1-heptene, 3-methyl-1-hexane, and the like. Examples of C4–C10 dienes include 1,3-butadiene, 1,4-pentadiene, isoprene, 1,5-hexadiene, 2,3-dimethyl hexadiene and the like.

Other polymers that may be added to the high melt strength polypropylene in the foamable composition including high, medium, low and linear low density polyethylene, fluoropolymers, poly (1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylenes/styrene (SEBS), and ethylene/propylene/diene copolymer (EPDM).

As described above, a variety of blowing agents may be used. The amount of blowing agent incorporated into a foamable polymer mixture can be chosen to yield a foam having a void content in excess of 10%, and even in excess of 20%, as measured by density reduction; i.e., 1—(the ratio of the density of the foam to that of the neat polymer)×100. Generally, these greater foam void contents can enhance fibrillation and can produce a greater yield of a fibrillated surface.

Another type of microfibrillatable material that can be used according to the invention to produce hydrophilic microflakes or microfibers and microfibrillated articles are those polymeric oriented film materials described in Applicants' U.S. Pat. No. 6,331,433, entitled "Films Having a Fibrillated Surface and Methods of Making."

According to that description, oriented, immiscible mixtures of semicrystalline polymer and void-initiating component are prepared such that they can be microfibrillated. The films can be produced by providing an oriented polymeric film comprising an immiscible mixture of a crystalline polymer and a void-initiating component, stretching the film along at least one major axis to impart a voided morphology, optionally stretching the film along a second major axis, and microfibrillating the voided film, e.g., with fluid energy, to produce microfibers or microflakes.

The term "void-initiating component" refers to ingredients that have the effect of producing voids that facilitate microfibrillation, and includes the foaming agents mentioned above. The void-initiating component can also be a polymeric material or a solid material, such as a material that is immiscible in the melt-processable polymer, as just mentioned.

Important examples of void-initiating agents include organic and inorganic solids having an average particle size of from about 0.1 to 10.0 microns and may be any shape including amorphous shapes, needles, spindles, plates, diamonds, cubes, and spheres. Useful inorganic solid void initiating components include solid or hollow glass, ceramic or metal particles, microspheres or beads; zeolite particles; inorganic compounds including but not limited to metal oxides such as titanium oxide, alumina, and silicon dioxide;

metal, alkali- or alkaline earth carbonates or sulfates; kaolin, talc, carbon black, silicates including calcium metasilicates (e.g., wollastonites), and the like. Inorganic void initiating components can be chosen to have little surface interaction, due to either chemical nature or physical shape, when dispersed in a semicrystalline polymer component. In general, preferred inorganic void initiating components should not be chemically reactive with the semicrystalline polymer component, including Lewis acid/base interactions, and preferably have minimal van der Waals interactions.

Certain preferred void initiating agents can include thermoplastic polymers, such as semicrystalline polymers and amorphous polymers, to provide a blend immiscible with the semicrystalline polymer component. An immiscible blend shows multiple amorphous phases as determined, for example, by the presence of multiple amorphous glass transition temperatures.

Polymers useful as void initiating component include semicrystalline polymers described herein, as well as amorphous polymers, selected to form discrete phases upon cooling from a melt. Useful amorphous polymers include polystyrene, polymethylmethacrylate, polycarbonate, cyclic olefin copolymers (COCs) such as ethylene norbornene copolymers, and toughening polymers such as styrene/butadiene rubber (SBR) and ethylene/propylene/diene rubber (EPDM). Specific useful combinations of immiscible polymer blends include, for example, polypropylene and polybutylene terphthalate, polypropylene and polyethylene terphthalate, polypropylene and polystyrene, polypropylene and high density polyethylene, polypropylene and low density polyethylene, polypropylene and polycarbonate, polypropylene and polymethylpentene; and polypropylene and nylon.

Preferred amounts of such void initiating components included in a fibrillatable material can be in from 1 to about 49 percent by weight, e.g., from 5 to about 40 percent by weight, or from about 10 to about 25 percent by weight, so that the first semicrystalline polymer forms a continuous phase and the void initiating component forms a discrete, discontinuous phase.

Other details and preferred aspects of microfibrillatable polymeric materials are described in the Assignee's U.S. Pat. No. 6,331,433. Such information, in combination with the present description, will be useful for the skilled artisan to prepare hydrophilic microflakes and microfibers and microfibrillated articles containing a hydrophilic component, according to the invention.

Another type of fibrillatable material that can be used according to the invention to produce hydrophilic microfibers and microflakes, and microfibrillated articles, includes those polymeric multi-layer films sometimes referred to as "microlayer films." Microlayer films are known in the arts of polymeric films, and are well known for their optical properties. Examples of microlayer film constructions and methods for preparing microlayer films (and some explanation of their uses and principles of their operation) are described, for example, in the following United States patents: U.S. Pat. Nos. 5,269,995, 6,124,971, and 6,101,032. Assignee's copending United States patent application entitled "Fiber Films and Articles from Microlayer Substrates," filed May 15, 2001, and assigned U.S. Ser. No. 09/858,253, the disclosure of which is incorporated herein by reference.

Microlayer films are generally understood, and are known for their specialty optical properties. Microlayer films useful according to the invention, while being similar in construction and methods of preparation, are prepared with the idea of forming microflakes or microfibers from the film, as opposed to providing films with select optical properties.

Microlayer films can be produced from a great variety of polymeric materials co-extruded to form a stack of multiple (preferably a large number) layers of one or different polymers, copolymers, or mixtures of polymers, having very small, preferably extremely small thicknesses.

The thickness of the total film and the individual layers of a microlayer film can be any thicknesses that will allow microfibrillation. Each of these thickness values may have practical limitations based on processing considerations, such as the total maximum number of layers that can be cast using a co-extrusion process, the minimum thickness of such layers, and the total thickness of a coextruded film that can be either cast or further processed, e.g., calendered.

A microlayer film can include tens, hundreds, thousands, or tens of thousands of layers of the same, similar, or any number of different polymeric compositions, which may be a single polymer, a copolymer, or a mixture of two or more polymers or copolymers. Reasons for choosing a polymer or copolymer as part of a stack can depend on various factors relating especially to the desired properties of different layers of the stack; how those properties relate to other layers of a stack; and the ability of different types of materials to form microflakes or microfibers; among other factors. For instance, microlayers of two or many more polymeric materials can be included in a single microlayer stack to obtain a microlayer film that can be microfibrillated to produce microflakes or microfibers with any number of different polymers and properties on a single microfibrillated surface.

The microlayer film can contain as many materials as there are layers in the stack, or more. For ease of manufacture, preferred stacks may contain only a few different materials, or only one or two.

Examples of useful polymer materials for layers of a microlayer film can include such polymeric materials as polyethylene naphthalate (PEN); polyesters such as polyethylene terephthalate (PET); amorphous copolyesters, copolymers of PEN such as 90/10 Co-PEN; PETG glassy PET); poly methyl(meth)acrylate and copolymers thereof; polypropylene; polystyrene; atactic polystyrene; polyethylene; fully saturated ethylene/propylene rubber in a polypropylene matrix; metallocene poly(alpha-olefin); ethylene-propylene; ethylene vinyl acetate in polypropylene; maleate grafted polypropylene in polypropylene, and the like.

Certain microlayer films can be oriented, especially uniaxially oriented, to cause one or more of the layers to become a microfibrillatable layer.

Microlayer films can be produced using co-extrusion techniques and equipment generally known to the skilled artisan. Generally, according to co-extrusion methods, multiple streams of one or a number of different melt-processable polymeric materials are divided to flow through a modular feedblock, which may be further divided into substreams and re-combined into a composite stream that passes through an extrusion die to form a multi-layer film in which each very thin layer is generally parallel to the major surfaces of adjacent layers.

The number of layers in the film can be selected to achieve desired fibrillation properties, typically using a minimum number of layers for reasons of film thickness, flexibility and economy. While films having more layers can also be useful, e.g., up to 40,000 layers or more, useful films can typically have fewer than 10,000 layers, more preferably fewer than 5,000, and even more preferably fewer than 2,000 or 1,000 layers.

Typical total thicknesses of cast (in-process microlayer) films, after extrusion but prior to any post-extrusion processing such as lengthening or calendering, can be in the range from about 5 mils (127 μm) to about 400 mils (10,160 μm), e.g., from about 10 mils (254 μm) to about 400 mils (10,160 μm), e.g., 10 to 100 mils (254 μm to 2540 μm), and with the range from about 30 mils (762 μm) to about 65 mils (1651 μm) sometimes being preferred. The thickness of typical layers of a microlayer film, as extruded and prior to subsequent processing such as calendering and stretching, can be any thickness, generally from about 2 microns to about 10,000 microns, with typical thicknesses being approximately in the range from about 2 microns to about 100 microns.

The ability to achieve microfibrillation of a microlayer film can be influenced by the composition of the layers, the number of layers and thickness of each layer, and processing conditions used to prepare the film. In the case of organic polymers that can be oriented by stretching, the films are generally prepared by extruding and orienting by stretching at a selected temperature, optionally followed by heat-setting at a selected temperature. Alternatively, the extrusion and orientation steps may be performed simultaneously. It has been found that microfibrillation of a microlayer film can be achieved by stretching a film substantially in one direction (uniaxial orientation or mono-axial). A uni-axial orientation of 3:1 or more is typically useful, for forming microfibers.

Methods for producing any of various types of microfibrillatable materials and films are well known in the arts of polymeric materials and film processing. Melt-processable polymers and other materials can be used with those methods, and with a hydrophilic component according to the invention, based on proper selection of the chemistries, properties, and amounts of each, to produce microfibrillatable materials or films for production of hydrophilic microfibers and microflakes. Examples of useful techniques include extrusion, co-extrusion, lamination, and other known methods of processing films, all of which are well known and understood in the polymer film arts. Useful equipment for producing the films will also be apparent to those of ordinary skill, including extruders, multi-cavity die extruders, and laminators, as well as various other types of equipment known in the arts of films and film processing, some of them being mentioned herein. Also well known are subsequent processing techniques for films such as casting, quenching, annealing, calendering, orienting, solid-state drawing, roll-trusion and the like. Using these techniques, suitable equipment, and the present disclosure, a skilled artisan will be able to prepare microfibrillatable materials and microfibrillated articles according to the invention.

Generally, according to the invention, a hydrophilic component can be included in a melt-processable polymeric material, e.g., as described above, to be processed together to a microfibrillated article. According to the invention, the chemistry and amount of hydrophilic component can be selected so that the melt-processable material containing melt-processable polymer and hydrophilic component can still be processed to a microfibrillated microflake or microfiber surface, meaning that the mixture of melt-processable polymer and hydrophilic component remains melt-processable to form a film that can be further processed to a microfibrillatable film (e.g., by extension, orienting, or calendering, etc.), and that the melt-processed and further processed film can be microfibrillated to form hydrophilic microflakes or microfibers at a surface of the film.

Whether or not an amount of a particular hydrophilic component can successfully be included in a melt-processable polymer and processed to produce hydrophilic microflakes or microfibers as discussed above can be determined starting from the present description generally, and more specifically as follows. As one criterion, a hydrophilic component should be able to be uniformly mixed, blended, dissolved, or otherwise incorporated into a melt-processable polymer in an amount that will produce hydrophilicity in a resulting microfibrillated microflake or microfiber, but that will not eliminate the melt-processable nature of the mixture of melt-processable polymer and hydrophilic component. In other words, a hydrophilic component should be capable of being added to melt-processable polymer, and the mixture should be capable of being melt-processed into a film having useful mechanical properties and good consistency and uniformity, at least sufficient to process the extruded film further toward a microfibrillated article. Also, a hydrophilic component can be selected and added in an amount that will allow the film of the melt-processed polymer and hydrophilic component mixture to be extended, length oriented, or calendered, to provide the film with a proper combination of mechanical properties, chemical properties, physical properties (e.g., voids), and morphological properties (e.g., crystallinity and orientation), to form microflakes or microfibers upon microfibrillation; and the film should be capable of being stretched, oriented, or otherwise processed, without breaking or tearing, to provide an oriented film capable of being microfibrillated to form microflakes or microfibers. A hydrophilic component should also be selected so the melt-processed and oriented film of polymer and hydrophilic component mixture can be processed to form hydrophilic microfibers or microflakes from the film by microfibrillation, e.g., the processed film maintains sufficient mechanical properties to withstand microfibrillation, and, based on the morphology, etc., as just mentioned, can form microfibers and/or microflakes when microfibrillated. Finally, the hydrophilic component must still be present and effective in the microfibrillated structure to improve hydrophilicity of the polymeric material. Not all of the large number of known and commercially available hydrophilic materials will be useful according to these criteria, with any one or more melt-processable polymer useful to form a microfibrillatable film. A skilled artisan, based on the present disclosure, will be sufficiently informed to identify hydrophilic components that can be used to form hydrophilic microflakes and microfibers, as well as their useful amounts, in combination with different types of melt-processable polymers, such as those containing void initiating components, those containing microlayers, and those processed to include a blowing agent, as well as others.

A type of useful hydrophilic component is the class of materials known as hydrophilic surfactants. Hydrophilic surfactants include well known commercially available materials, and come in a variety of different chemistries, including anionic, nonionic, cationic, and amphoteric chemistries, etc., as well as many varieties of different chemical compound species within each of these broader classes, e.g., fluorinated, non-fluorinated, and those substituted with chemical functional groups such as acidic groups (e.g., carboxylic acids), amides, amines, hydroxyls, and others.

Useful fluorochemical surfactants include fluoroaliphatic group-containing nonionic compounds that contain one or more blocks of water-solubilizing polyoxyalkylene groups in their structures. A class of such surfactants is described in U.S. Pat. No. 5,300,357 (Gardiner), the description of which is incorporated herein by reference. Generally, a type of fluorochemical surfactant useful in the invention includes those represented below by Formula I:

$$(R_f\text{-}Q)_n\text{-}Z \tag{I}$$

wherein:

$R_f$ is a fluoroaliphatic group having at least 4 fully-fluorinated carbon atoms that may be straight-chained, branched, or, if sufficiently large, cyclic, or any combination thereof. The skeletal chain in the fluoroaliphatic radical can include one or more catenary heteroatoms, such as oxygen, hexavalent sulfur, and trivalent nitrogen atoms, bonded only to carbon atoms of the skeletal chain. Fully fluorinated fluoroaliphatic groups are preferred, but hydrogen or chlorine atoms may be present as substituents, provided that not more than one atom of either is present for every two carbon atoms. While $R_f$ can contain a large number of carbon atoms, compounds where $R_f$ is not more than 20 carbon atoms may typically be adequate, because longer $R_f$ chains usually represent a less efficient use of the fluorine than is possible with shorter chains. Fluoroaliphatic groups or chains containing from about 4 to about 12 carbon atoms can be preferred. Generally, $R_f$ can contain between about 40 and about 78 weight percent fluorine. The terminal portion of the $R_f$ group can preferably contains at least four fully fluorinated carbon atoms, e.g., $CF_3CF_2CF_2CF_2$—, and particularly preferred compounds are those in which the $R_f$ group is fully or substantially completely fluorinated, as in the case where $R_f$ is a perfluoroalkyl, e.g., $CF_3(CF_2)_n$—. Suitable $R_f$ groups include, for example, $C_4F_9$—, $C_8F_{17}$—, $C_6F_{13}CH_2CH_2$—, and $C_{10}F_{21}$—$CH_2CH_2$—.

Q in Formula I above is a multivalent, generally divalent, linking group, or is a covalent bond, that provides a means to link $R_f$ with the depicted group Z, Q can comprise a heteroatom-containing group, e.g., a group such as —S—, —O—, —CO—, —SO$_2$—, —N(R)— (where R is a hydrogen or a C1 to C6 substituted or unsubstituted alkyl group that may comprise a catenary heteroatom such as O, N, S), —$C_nH_{2n}$— (n=1 to 6); Q can comprise a combination of such groups, such as would give, for example, —CON(R)$C_nH_{2n}$—, —SO$_2$N(R)$C_nH_{2n}$—, —SO$_3C_6H_4$N(R)$C_nH_{2n}$—,
—SO$_2$N(R)$C_nH_{2n}$O[CH$_2$CH(CH$_2$Cl)O]$_g$CH$_2$CH(CH$_2$Cl)— (n=1 to 6; g=1 to 10),
—SO$_2$N(CH$_3$)C$_2$H$_4$OCH$_2$CH(OH)CH$_2$—, —SO$_2$N(C$_2$H$_5$)C$_2$H$_4$OCH$_2$CH(OH)CH$_2$—,
—SO$_2$N(H)CH$_2$CH(OH)CH$_2$NHC(CH$_3$)CH$_2$—, —(CH$_2$)$_2$S(CH$_2$)$_2$—, and
—(CH$_2$)$_4$SCH(CH$_3$)CH$_2$—.

Z in Formula I above is a nonionic, water-solubilizing group comprising a poly(oxyalkylene) group, (OR')$_x$, where R' is an alkylene group having from 2 to about 4 carbon atoms, such as —CH$_2$CH$_2$—, —CH$_2$CH$_2$CH$_2$—, —CH(CH$_3$)CH$_2$—, and —CH(CH$_3$)CH(CH$_3$)—, and x is a number between about 6 and about 20. Z can preferably contain a poly(oxyethylene) group. The oxyalkylene units in the poly(oxyalkylene) can be the same, such as in poly(oxypropylene), or can be present as a mixture, such as in a straight or branched chain of randomly distributed oxyethylene and oxypropylene units i.e., poly(oxyethylene-co-oxypropylene), or as in a straight or branched chain blocks of oxypropylene units. The poly(oxyalkylene) chain can be interrupted by or include one or more catenary linkages such as where Z includes a group of the formula —O—CH$_2$—CH(O—)—CH$_2$—O—, provided that such linkages do not substantially alter the water-solubilizing character of the poly(oxyalkylene) chain. The Z group may be terminated with a hydroxyl, lower alkyl ether, alkaryl ether, or fluoroalkyl ether, for example, —OCH$_3$, —OCH$_2$CH$_3$, —OC$_6$H$_4$C(CH$_3$)$_2$CH$_2$C(CH$_3$)$_2$CH$_3$, —OC$_6$H$_4$(C$_9$H$_{19}$)$_2$, —OC$_{12}$H$_{25}$, —OC$_{14}$H$_{29}$, —OC$_{16}$H$_{33}$, or —O-QR$_f$ (where Q and R$_f$ are as defined supra); and n is a number from 1 to 6.

Among preferred examples of Formula I surfactants are $C_8F_{17}SO_2N(CH_3)(CH_2CH_2O)_7CH_3$, $C_4F_9SO_2N(CH_3)(CH_2CH_2O)_7CH_3$,
$C_8F_{17}SO_2N(CH_3)(CH_2CH_2O)_9C_8H_{17}$,
$C_8F_{17}SO_2N(CH_3)(CH_2CH_2O)_{10}C_6H_4C(CH_3)_2CH_2C(CH_3)_2CH_3$, and
$C_8F_{17}SO_2N(CH_3)(CH_2CH_2O)_{10}C_{12}H_{25}$.

Fluoroaliphatic group-containing nonionic surfactants, including those depicted in formula I, may be prepared using known methods including those methods described in U.S. Pat. No. 2,915,554 (Albrecht et al.), incorporated herein by reference. The Albrecht patent describes the preparation of fluoroaliphatic group-containing nonionic compounds from active hydrogen-containing fluorochemical intermediates, such as fluoroaliphatic alcohols (e.g., $R_fC_2H_4OH$), acids (e.g., $R_fSO_2N(R)CH_2CO_2H$), and sulfonamides (e.g., $R_fSO_2N(R)H$), by reaction of the intermediates with, for example, ethylene oxide to yield, respectively, $R_fC_2H_4(OC_2H_4)_nOH$, $R_fSO_2N(R)CH_2CO_2(C_2H_4O)_nH$, and $R_fSO_2N(R)(C_2H_4O)_nH$, where n is a number greater than about 3 and R is a hydrogen or a lower alkyl group (e.g., from 1 to 6 carbon atoms). Analogous compounds may be prepared by treating the intermediate with propylene oxide. The fluoroaliphatic oligomers disclosed in U.S. Pat. No. 3,787,351 (Olson), and certain fluorinated alcohol-ethylene oxide condensates described in U.S. Pat. No. 2,723,999 (Cowen et al.), whose descriptions are incorporated herein by reference, are also considered useful. Fluoroaliphatic group-containing nonionic surfactants containing hydrophobic longchain hydrocarbon groups may be prepared by reacting a fluoroaliphatic epoxide with, for example, an ethoxylated alkylphenol or alcohol, such as $CH_3C(CH_3)_2CH_2C(CH_3)_2C_6H_4(OC_2H_4)_{9.5}OH$ or $C_{12}H_{25}(OC_2H_4)_9OH$, respectively, in the presence of BF$_3$ etherate. They may also be prepared by first converting the ethoxylated alkylphenol or alcohol to a chloride by reaction with thionyl chloride, then reacting the resulting chloride with a fluoroaliphatic sulfonamide containing an active hydrogen, for example $C_8F_{17}SO_2NH(CH_3)$, in the presence of sodium carbonate and potassium iodide.

A class of useful non-fluorinated, nonionic polyoxyethylene-containing hydrophilic surfactants, that may be used alone or in conjunction with the fluoroaliphatic group-containing nonionic surfactants, may be represented generally by the following Formula II:

$$R_h\text{-}Z\text{-}(C_2H_4O)_x\text{—}C_2H_4\text{-}Z\text{-}R_h' \tag{II}$$

wherein:

$R_h'$ is an alkyl or an aryl group, or a combination thereof, that may be substituted or unsubstituted and that contains from 2 to about 20 carbon atoms whose skeletal chain may be straight-chained, branched, or, if sufficiently large, cyclic, or any combination thereof, and the skeletal chain can also optionally include one or more heteroatoms such as oxygen, hexavalent sulfur, and trivalent nitrogen atoms bonded to the carbon atoms of the skeletal chain;

$R_h'$ is a hydrogen atom or is an alkyl or an aryl group as described supra for $R_h$;

one or both of $R_h$ and $R_h'$ may contain a polydialkylsiloxane group of the formula, R—(Si(R)$_2$—O)$_n$—Si(R)$_2$—, where all the depicted R groups are independently selected as alkyl or aryl groups having from 2 to about 10 carbon atoms that may be substituted or unsubstituted, straight-chained or branched, cyclic or acyclic, and may contain one or more catenary heteroatoms; and wherein n can be chosen such that n is between 2 and about 40, preferably 2 and about 20, and such that the weight percent of polyoxyethylene in the surfactant is between about 20 and 80 percent, preferably between 30 and 60 percent.

Z is an oxygen or sulfur atom or is of the formula —CO—, —COO—, —NH—, —CONH—, or —N(R)— where R is a substituted or unsubstituted alkyl or aryl group having from 1 to 10 carbon atoms that may contain heteroatoms such as oxygen, sulfur, or nitrogen, and may contain one or more ethylene oxide groups; where R is an alkyl group, that alkyl group may be cyclic or acyclic; and x is a number selected such that the weight percent of ethylene oxide in the surfactant is between about 20 and 80 percent, preferably from about 40 to about 70 percent.

Representative hydrocarbon surfactants according to Formula II above include ethoxylated alkylphenols (such as the Triton TX, Igepal CA and Igepal CO series, commercially available from Union Carbide Corp. and Rhone-Poulenc Corp. respectively), ethoxylated dialkylphenols (such as the Igepal DM series, also commercially available from Rhone-Poulenc Corp.), ethoxylated fatty alcohols (such as the Tergitol series, commercially available from Union Carbide Corp.) and polyoxyethylene fatty acid diesters (such as the Mapeg DO series, commercially available from PPG Industries, Inc.).

Another class of non-fluorinated, nonionic polyoxyethylene-containing surfactants useful in combination with the fluoroaliphatic surfactants in accordance with the invention may be described by the following Formula III:

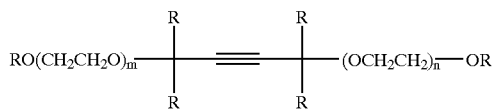

wherein:

n and m are numbers between 2 and about 20 and are chosen such that the weight percent of polyoxyethylene in the surfactant is between 20 and 80 percent, preferably between 30 and 60 percent; and each R is selected independently from one another as an alkyl or an aryl group that may be substituted or unsubstituted and that contain from 2 to about 20 carbon atoms whose skeletal chain may be straight-chained, branched, or, if sufficiently large, cyclic, or any combination thereof; such skeletal chain can also optionally include one or more heteroatoms such as oxygen, hexavalent sulfur, and trivalent nitrogen atoms bonded to the carbon atoms of the skeletal chain.

Another class of useful non-fluorinated, nonionic polyoxyethylene-containing surfactants useful in the practice of the invention alone or in combination with the one or more fluoroaliphatic surfactants include those organosiloxane compounds that may be represented generally by the following Formula IV:

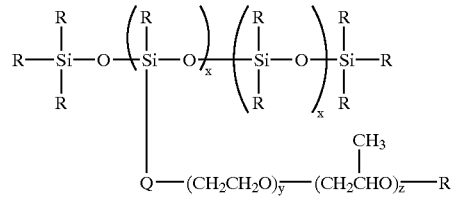

wherein:

n, x, y, and z denote the number of repeating units in the depicted surfactant and are chosen such that the weight percent of polyethylene oxide in the surfactant is between 20 and 80 percent, preferably between 40 and 70 percent, and most preferably between 40 and 60 percent. It will be understood that the recurring siloxane units in the depicted formula may be randomly situated in the surfactant molecule;

Q is a multivalent, generally divalent, linking group, or is a covalent bond, that provides a means to link the silicon atom to the depicted oxyalkylene group; Q can comprise a heteroatom-containing group, e.g., a group containing —O—, —CO—, —C$_n$H$_{2n}$O—, or —OC$_n$H$_{2n}$O— where n is a number from 1 to 6; and each R is selected independently from one another as an alkyl or an aryl group that may be substituted or unsubstituted and that contain from 2 to about 20 carbon atoms whose skeletal chain may be straight-chained, branched, or, if sufficiently large, cyclic, or any combination thereof, and the skeletal chain can also optionally include one or more heteroatoms such as oxygen, hexavalent sulfur, and trivalent nitrogen atoms bonded to the carbon atoms of the skeletal chain.

Useful organosiloxane surfactants of the type depicted by Formula IV include ethoxylated polydimethylsiloxanes, such as Silwet L-77, commercially available from Union Carbide Corp.

Another class of hydrophilic surfactants useful in the invention includes monoglycerides, with preferred monoglyceride surfactants being those derived from glycerol and medium to long chain length (i.e., C$_8$ to C$_{16}$) fatty acids such as caprylic, capric, and lauric acids. See, e.g., PCT International Publication Number WO 00/71789, the entire description of which is incorporated herein by reference. Preferably, the monoglycerides can be derived from C$_{10}$ to C$_{12}$ fatty acids and can be foodgrade and Generally Regarded as Safe ("GRAS") materials. Examples of preferred monoglycerides include glycerol monolaurate, glycerol monocaprate, and glycerol monocaprylate. Because monoglycerides are typically available in the form of mixtures of unreacted glycerol, monoglycerides, diglycerides, and triglycerides, it can be preferred to use mixtures that contain a high concentration (e.g., greater than about 80 wt. %, preferably greater than about 85 wt. %, more preferably greater than about 90 wt. %, and most preferably greater than about 92 wt. %) of the monoglyceride. A convenient way to determine whether one of the aforementioned mixtures, or even a particular monoglyceride, will work in the invention, is to calculate the hydrophilic-lipophilic balance ("HLB value") for the mixture. Typically, the HLB value of one of the aforementioned mixtures decreases with increasing fatty acid chain length, and also decreases as the diglyceride and triglyceride content in the mixture increases. Useful materials (including pure monoglycerides) typically have HLB values of about 4.5 to about 9, more preferably from about 5.3 to about 8. Examples of particularly useful commercially available materials include those available from Med-Chem Laboratories, East Lansing, Mich., under the tradename LAURICIDEN™, and Dimodan ML-90, a glycerol monolaurate of 90% purity, available from Danisco USA, Inc. through distributor Gillco Ingredients, Vista, Calif.

Another class of hydrophilic surfactant useful in the present invention alone or with any one or more of the monoglyceride surfactants described above are the fatty acid esters of anhydrosorbitol, such as SPAN™ 20 (sorbitan monolaurate) and SPAN 40 (sorbitan monopalmitate) available from ICI Americas Inc., EXACT™ 4023 available from Exxon, and Montell™ DP-8340 available from Montell, and their polyoxyethylene derivatives, such as TWEEN™ 20 and TWEEN 40, available from ICI Americans Inc. Fatty acid chain lengths of 8 to 16 carbons are preferred, with 12 to 16 can be preferred.

Embodiments of microfibrillated articles of the invention can be prepared by blending or otherwise uniformly mixing a hydrophilic surfactant into a solid melt-processable polymer, e.g., by intimately mixing hydrophilic surfactant with pelletized or powdered melt-processable polymer, and melt extruding the mixture into a film or web using any process for producing such films or webs, such as by conventional extruding, co-extruding, etc.

Hydrophilic surfactant can be added to a melt-processable polymer in an amount sufficient to improve hydrophilicity of the microfibrillated article, e.g. of microflakes or microfibers of the article. Enough hydrophilic surfactant should be used to produce a desired hydrophilicity, but not so much to prevent processing of the mixture of melt-processable polymer and hydrophilic surfactant to form a microfibrillated article. Hydrophilic surfactant should not be added in an amount that would cause the product of the mixture to become unduly weak or to break when melted, stretched, or oriented, or unable to be microfibrillated. Useful amounts of hydrophilic surfactant included in a melt-processable polymer can vary depending on the particular chemistries of each component, and other factors. Examples of useful amounts can be in the range from about 1 to about 10 parts by weight hydrophilic surfactant based on 100 parts by weight melt-processable polymer, with the range from about 1 to about 5 parts by weight hydrophilic surfactant, based on 100 parts by weight melt-processable polymer, being preferred.

Another type of useful hydrophilic component includes hydrophilic polymers, which can be any polymeric material that has a hydrophilic chemistry, and, according to the invention, that can be incorporated into a microfibrillated article to allow production of microflakes or microfibers having a desired hydrophilicity.

Examples of hydrophilic polymers include known polymeric materials such as carboxylic acid containing polymers, e.g. polymers and copolymers synthesized from acrylic acid and/or methacrylic acid including salts thereof, polyacrylamides, polyesters, hydroxymethylcellulose, hydroxypropylcellulose and other polymers. In certain types of hydrophilic polymers, one or more functional groups are included on the backbone of the polymer to enhance the hydrophilic nature of the polymer. For example, a hydrophilic polymer may include any type of polymeric backbone that contains in-chain hydrophilic groups, pendent hydrophilic groups, terminal hydrophilic groups, or combinations thereof. Examples of hydrophilic groups include hydroxyl groups, oxyalkylene groups, amino groups, carboxylic acid groups, amido groups, cyclic amido groups, and sulfonate groups, among others. Exemplary oxyalkylene groups may be oxyethylene or a combination of oxyethylene with oxypropylene, oxybutylene, or both. Cyclic amido groups may be 2-pyrrolidinonyl, 2-piperidinonyl, and the like. Sulfonate groups may be sulfonic acid groups and salts thereof. Carboxylate groups may be carboxylic acid groups and salts thereof. Specific examples of important hydrophilic polymers include sulfonated polyesters; polyvinylpyrrolidone; blends of polyvinylpyrrolidone with melt processable carboxylic acid containing copolymers; and polyacrylamides such as poly(dialkyl acrylamides) (e.g., poly(N,N-dimethylacrylamide). Melt processable carboxylic acid containing copolymers preferred for blends with polyvinylpyrrolidone are ionomers, for example, ionomer copolymers of ethylene and acrylic or methacrylic acid.

A hydrophilic polymer itself may or may not be "melt-processable." According to the invention, hydrophilic polymers, melt-processable or otherwise, may be added to a melt-processable polymer in an amount sufficient to improve hydrophilicity, but also sufficient to retain properties of the film that allow processing of the melt-processable polymer to form a film that is a hydrophilic microfibrillatable film.

The amount of hydrophilic polymer included in any particular microfibrillatable film or microfibrillatable article can be any amount that will result in a desirably hydrophilic microfibrillated article, including an amount that will improve the hydrophilicity of a less hydrophilic melt-processable polymer.

The particular amount of hydrophilic polymer used in any specific microfibrillated article can be based on a variety of factors such as the desired hydrophilicity; the chemistry of the hydrophilic polymer; the chemistry of the melt-processable polymer or other ingredients; processing conditions and physical properties of the ingredients, such as the ability of the mixture of hydrophilic polymer and melt-processable polymer to be extruded, oriented, microfibrillated; etc. Broadly, amounts between 1 to 70 parts by weight hydrophilic polymer per 100 parts total hydrophilic polymer and melt-processable polymer may be considered useful. Typical amounts of hydrophilic polymer versus melt-processable polymer may be in range from about 10 to 50 parts by weight hydrophilic polymer per 100 parts total hydrophilic polymer and melt-processable polymer, with the range between 20 and 30 parts by weight hydrophilic polymer being sometimes preferred. The exact amount for any hydrophilic polymer-melt-processable polymer combination will depend on many factors. As an example of one class of materials, preferred relative amounts of sulfonated polyester in a polyethylene or polypropylene may be in the range of 10 to 30 wt. %, more preferably 25 to 30 wt. % sulfonated polyester, per total polymer.

Once a microfibrillatable material is prepared from a melt-processable polymer and a hydrophilic component, the material can be microfibrillated to produce a microflake or microfiber surface by any of a variety of known and understood methods.

The term "microfibrillation," as used herein, refers to methods of imparting energy to liberate microfibers, microflakes, or similarly sized and shaped structures from a microfibrillatable polymeric film. Some methods for doing this are known in the art of processing polymeric materials, and include methods of imparting a gaseous fluid using, for example, ultrasound techniques, and methods of imparting liquid fluids such as water, for example using high-pressure water jets. Optionally, prior to microfibrillation, a film may be subjected to other mechanical steps to produce macroscopic microfibers from the microfibrillatable material, such as by the use of a rotating drum or roller having cutting elements such as needles or teeth in contact with the moving film, or by twisting, brushing (as with a porcupine roller), rubbing, for example with leather pads, and flexing.

A microfibrilled surface is a surface that includes microflakes or microfibers from one or more layers of a microfibrillatable material. The microflakes or microfibers are portions of the microfibrillatable material that have been at least partially mechanically separated or fragmented from the continuous film. Those portions may be viewed as or considered or referred to as microfibers, microflakes, or other forms of similarly sized and shaped fragmented pieces of the film, typically having a size and shape that depends on the particular microfibrillatable material and its physical and chemical properties, such as the type and degree of orientation, the presence and size of voids, multiple layers, layer thickness, spherulites, etc. One example of such a fragmented form is microfibers, which, based on these factors, can be typically relatively flat, thin, or elongate, e.g., "ribbon-shaped," with a typically rectangular cross section. Other forms may be relatively larger than microfibers, and may be shaped more as a flat, rectangular "flake" or "microflake." The microfibers and microflakes preferably remain attached to the microfibrillated material at one end, but may also become completely detached from the base film.

Microfibers in particular typically have a rectangular cross section with a cross sectional aspect ratio (transverse width to thickness) ranging from about 1.5:1 to about 20:1, preferably from 3:1 to 9:1. Preferred microfibers can also have one or more of the following features or dimensions: an average effective diameter of from 0.01 to 10 microns, preferably of less than 5 microns; an average cross-sectional area of $0.5\mu^2$ (microns squared) to $3.0\mu^2$, preferably from about $0.7\mu^2$ to $2.1\mu^2$. Further, the sides of the rectangular shaped microfibers are not normally smooth, but may have a scalloped appearance in cross section. Preferred microfiber surfaces may exhibit a surface area of at least 0.25 square meters per gram, as measured using an Autosorb-6 Physisorption Analyzer (Quantachrome Instruments, Boynton Beach, Fla.) using nitrogen as the absorbate.

If a voided or foamed material is biaxially oriented, after microfibrillation the majority of the material's surface comprises schistose structures, e.g., microflakes. These structures have an average thickness of 1 to 20 micrometers, preferably less than 5 micrometers, and an average width of from one to hundreds of micrometers, preferably from about 5 to 30 micrometers. These schistose structures can typically exhibit surface areas greater than 0.5 $m^2/g$, preferably greater than 0.7 $m^2/g$, as measured using an Autosorb-6 Physisorption Analyzer (Quantachrome Instruments, Boynton Beach, Fla.) with nitrogen as the absorbate.

One method of microfibrillating a film surface is with fluid jets. In this process, one or more jets of a fine fluid stream impact the surface of a microfibrillatable material which may be supported by a screen or moving belt, thereby releasing microfibers or microflakes from a film's polymer matrix. The degree of microfibrillation is dependent on the exposure time of the microfibrillatable material to the fluid jet, the pressure of the fluid jet, the cross-sectional area of the fluid jet, the fluid contact angle, the polymer properties, and to a lesser extent, the fluid temperature.

Any type of liquid or gaseous fluid may be used. Liquid fluids may include water or organic solvents such as ethanol or methanol. Suitable gases such as nitrogen, air, or carbon dioxide may be used, as well as mixtures of liquids and gases. Any such fluid is preferably non-swelling (i.e., is not absorbed by the film). The fluid can preferably be water.

The fluid temperature may be elevated, although suitable results may be obtained using ambient temperature fluids. The pressure of the fluid should be sufficient to impart some degree of microfibrillation to at least a portion of a microfibrillatable material, and suitable conditions can vary widely depending on the fluid, the nature of the polymeric material, including the composition and morphology, configuration of the fluid jet, angle of impact, and temperature. Typically, the fluid can be water at room temperature and at pressures of at least 3400 kPa (500 psi), although lower pressure and longer exposure times may be used. Such fluid will generally impart a minimum of 5 watts/$cm^2$ or 10 W/$cm^2$ based on calculations assuming incompressibility of the fluid, a smooth surface, and no losses due to friction.

The jets may be configured such that all or part of the film surface is microfibrillated. Alternatively, the jets may be configured so that only selected areas of the film are microfibrillated. Certain areas of the film may also be masked, using conventional masking agents, to leave selected areas free from microfibrillation. Likewise, the process may be conducted so that the microfibrillated surface penetrates only partially, or fully through the thickness of a single microfibrillatable material layer of a multi-layer microfibrillatable film, or fully or partially through one or more adjacent microfibrillatable material layers. If it is desired that the microfibrillation extend through the entire thickness of a multi-layer microfibrillatable film, conditions may be selected so that the integrity of the microfibrillated article is maintained and the film is not severed into individual yarns or microfibers.

Examples of products and processes that may be useful with those of the invention are described in Assignee's copending U.S. patent application Ser. No. 09/974,040, entitled "Microfiber Articles from Multi-Layer Substrates," filed on Oct. 9, 2001, and Ser. No. 09/858,273, entitled "Microfiber-Entangled Products and Related Methods," filed May 15, 2001, each of which is incorporated herein by reference.

A hydroentangling machine, for example, can be used to microfibrillate a surface of a microfibrillatable material, by exposing the microfibrillatable material to fluid jets. Alternatively, a pressure water jet, with a swirling or oscillating head, may be used, which allows manual control of the impingement of the fluid jet. Such machines are commercially available.

Microfibrillation may be accomplished by other methods as well, as will be understood by the skilled artisan, e.g., by immersing a microfibrillatable material in a high energy cavitating medium, e.g., and achieving cavitation by applying ultrasonic waves to the fluid.

EXAMPLES

Glossary

FCS-1—$C_8F_{17}SO_2N(Et)(CH_2CH_2O)_{7.2}CH_3$ prepared according to U.S. Pat. No. 2,915,554 (Ahlbrecht, et. al.).

FCS-2—$C_8F_{17}SO_2N(Me)(CH_2CH_2O)_{10}PhC(CH_3)_2CH_2C(CH_3)_3$ prepared according to the procedure for compound F-18 in U.S. Pat. No. 5,804,625 (Temperante, et al).

NuWet™ 500—a blend of organomodified polydimethylsiloxane (>65 weight %), polyalkylene oxide (<20 weight %), and ethoxylated alkyl (<20 weight %), available from OSI Specialties, Danbury, Conn.

Poly(vinylpyrrolidone)—PVP K90, available from International Specialty Products, Wayne, N.J.

Surlyn 1705—an ionomer copolymer of ethylene and acrylic acid, available from Dupont Chemical Co., Wilmington, Del.

Pycal 94—polyoxyethylene aryl ether, available from Uniqema, Wilmington, Del.

MBX-50—glass beads, available from Sekisui Plastics, Tokyo, Japan.

Irganox 1010—an antioxidant available from Ciba Specialty Chemicals, Tarrytown, N.Y.

PEG-P20K—a poly(ethylene oxide), PEG Pluracol 20K Pastille resin, supplied by BASF, Ludwigshafen, Germany.

Sorbitan monolaurate—available as SPAN™ 20 from Uniqema, New Castle, Del.

Dimodan ML-90—glycerol monolaurate of 90% purity, available from Danisco USA, Inc. through distributor Gillco Ingredients, Vista, Calif.

Test Procedures

Test Procedure 1—Density Measurement and Void Content Determination

Density of films and microfibers was measure at 23° C. in deionized water according to the method of ASTM D792–86. Samples were weighed on a Mettler AG245 high precision balance (Mettler-Toledo, Inc., Highstown, N.J.), and placed underwater. The mass of the water displaced was measured using the density measurement fixture. The volume of water displaced by the sample was thereby determined and, in combination with the sample weight, used to calculate the sample density. The void content was then calculated as follows:

Calculated Void content={1−(final density/initial density)}×100 where the initial density is the density of the cast film before orientation, and the final density is the density of the oriented film.

Test Procedure II—Draw Ratio Measurement

The draw ratio of some of the films were calculated by dividing the roll 4 output speed of the calender/length orienter by the input speed of the cast web into rolls 1 and 2. Roll 4 and rolls 1 and 2 were as described in Comparative Example C1.

Test Procedure III—Draw Ratio Calculation

The draw ratios of some of the films were calculated in the following manner. Density, width, and thickness of the cast film and of the oriented and voided film were measured. Assuming a conservation of mass, the draw ratios of the oriented and voided films were calculated by dividing (density×width×thickness) of the cast film by (density×width×thickness) of the oriented and voided film according to the following equation:

Draw Ratio=(density×width×thickness)cast film/(density×width×thickness)oriented film Test Procedure IV—Total Water Absorption and Retention To determine how well each of the samples could absorb and retain water, the following tests were done. Each of the fibrillated materials was first weighed on a scale. Then each sample was submerged in a container of tepid water for one minute. A corner of the sample was gripped using a tweezer, and the sample was transferred onto a balance in one fluid motion. Total water absorption was recorded as (wet weight−dry weight)/dry weight. Water retention was measured by soaking the sample in a container of water for one minute, gripping a corner of the sample with a tweezer, fully removing the sample from the water, hanging the sample from a spring clamp, allowing the sample to drip for one minute, and weighing the sample. Water retention was recorded as (weight after one minute drip−dry weight)/dry weight.

Additionally, because the samples were microfibrillated to a similar, but not necessarily equal extent, the oil absorption of the samples was determined, since oil absorption was an approximate measure of the extent of microfibrillation. Typically the more thoroughly a sample was microfibrillated, the more oil it absorbed. The dry microfibrillated films were weighed, and then soaked in peanut oil for one minute. The total oil absorption and oil retention after one minute drip were measured by the procedures described above, except peanut oil was used instead of water.

Test Procedure V—Rate of Water Absorption Test

The rate of water absorption gives a qualitative measure of the hydrophilic nature of a sample. A test method was developed to determine the water absorption rate for a fibrillated sample. A sample 2.54 cm wide and at least 10.16 cm long was prepared and marked with parallel lines at 0.635 cm intervals perpendicular to the sample's length direction. One end of the sample was clamped and the other end lightly weighted such that the sample hung vertically from the clamp. The clamped sample was slowly lowered into a water reservoir till the surface of the water came up to the first "mark" on the sample. The time taken for the water to wick to the next "mark" was noted. Subsequent time periods for the water to wick to successive "marks" was also noted, and the rate of water absorption calculated as the average of the ratios of the distance between each "mark" (0.635 cm) and the time for the water to wick from one "mark" to the next.

EXAMPLES

Comparative Example C1

A polypropylene film was prepared by extruding polypropylene homopolymer (Fina 3374X, available from Atofina Inc., Houston, Tex.) in a single screw extruder with an extruder temperature profile of 210° C., 226° C., 238° C., and 249° C. from the feed throat to the end of the extruder. The neck tube and die were maintained at 249° C. The extruder was equipped with a barrier screw having a mixing tip and with a 12.7 cm wide, single layer die having an orifice gapped to a nominal 1.27 mm. A film having a thickness of 1.36 mm and a width of 127 mm was prepared using a three-roll stack casting station. In the three-roll stack, the bottom chrome-coated stainless steel roll was set to 190° C., the middle chrome-coated stainless steel roll was set to 210° C., and the top silicon rubber roll was cooled with 55° C. water. The polymer melt exiting the extruder die entered the three-roll stack between the bottom and middle rolls, and after passing between the bottom and middle rolls, traveled over the middle roll into the nip formed by the middle and top rolls. After passing over the top roll, the resulting cast film exited the three-roll stack. During film preparation, the silicon rubber roll heated up to near the temperature of the middle roll. The cast film had a density of 0.9 gram/cm³ as determined by Test Procedure I.

The cast film was calendered and length oriented as follows. The cast film was fed from an unwind station at a rate of 0.27 m/min, through a series of idler rolls and into the compressive nip of a calender (rolls 1 and 2). Rolls 1 and 2 each had a surface speed of 0.91 m/min and 1.1 m/min, respectively, a temperature of 120° C., and a gap between the rolls of 0.18 mm. The film exiting rolls 1 and 2 was further oriented as it passed over heated roll 3 and then heated roll 4 in an "S" configuration. Roll 3 had a surface speed of 6.14 m/min and a temperature of 145° C. Roll 4 had a surface speed of 6.45 m/min and a temperature of 140° C. The resulting film passed around a portion of roll 5, which was unheated and simply used to cool the film. The resulting calendered/length oriented film was wound onto a core under tension. For each of the films, the speed of roll 4 was chosen to be just below the speed where the film broke. The film was oriented to a draw ratio of 23.6:1 as determined by Test Procedure II. The oriented film had a thickness of 98 micrometers, a width of 165 mm, and a density of 0.87 gram/cm$^3$. The film was calculated to contain 4% voids as determined by Test Procedure I.

Finally the calendered/length oriented film was microfibrillated on both major surfaces in a hydroentangler (70 cm wide, S/N 101, Project# 2303: manufactured by Honeycomb Systems Inc., Biddeford, Me.) using approximately 14 MPa water pressure, with 6 passes on each side through the hydroentangler, a belt speed of 3.05 m/min, and a water jet strip having 15.75 holes/cm, with each hole having a diameter of 110 microns. The water and oil absorption of the resulting microfibrillated film was measured according to Test Procedure IV, and the results are shown in Table 1.

Example 1

A film was prepared by extruding a blend containing 80 weight % polypropylene homopolymer (Fina 3374X, available from Atofina Inc., Houston, Tex.), 17 weight % polypropylene homopolymer (Fina PP3445, available from Atofina Inc., Houston Tex.), and 3 weight % FCS-1 in a single screw extruder as in Comparative Example C1, except that the extruder temperature profile was set to 204° C., 221° C., 232° C., and 243° C., and in the three-roll stack, the bottom roll was set to 140° C., and the middle roll was set to 150° C. The resulting cast film had a thickness of 0.99 mm, a width of 111 mm, a density of 0.91 gram/cm$^3$ as determined by Test Procedure I.

The cast film was calendered and length oriented as described in Comparative Example C1, except that the cast film was fed from an unwind station at a rate of 0.24 m/min, roll 3 had a surface speed of 5.49 m/min, and roll 4 had a surface speed of 5.76 ml/min. The resulting calendered/length oriented film was oriented to a draw ratio of 23.9:1 as determined by Test Procedure II. The oriented film had a thickness of 90 micrometers, a width of 500 mm, and a density of 0.71 gram/cm$^3$. The oriented film was calculated to contain 22% voids as determined by Test Procedure I.

Finally the calendered/length oriented film was microfibrillated as in Comparative Example C1, however using approximately 11.7 MPa water pressure and passing the film through the hydroentangler 6 times per side. The water and oil absorption of the resulting microfibrillated film was measured according to Test Procedure IV, and the results are shown in Table 1.

Example 2

A film was prepared by extruding a blend containing 80 weight % polypropylene homopolymer (Fina 3374X, available from Atofina Inc., Houston, Tex.), 17 weight % polypropylene homopolymer (Fina PP3445, available from Atofina Inc., Houston Tex.), and 3 weight % FCS-2 in a single screw extruder as in Comparative Example C1, except that the extruder temperature profile was set to 204° C., 221° C., 232° C., and 243° C. The resulting cast film had a thickness of 1.23 mm, a width of 119 mm, a density of 0.92 gram/cm$^3$ as determined by Test Procedure I.

The cast film was calendered and length oriented as described in Comparative Example C1, except that the cast film was fed from an unwind station at a rate of 0.23 m/min, roll 3 had a surface speed of 5.49 ml/min, and roll 4 had a surface speed of 5.49 m/min. The resulting calendered/length oriented film was oriented to a draw ratio of 24.0:1 as determined by Test Procedure II. The oriented film had a thickness of 110 micrometers, a width of 530 mm, and a density of 0.72 gram/cm$^3$. The film was calculated to contain 22% voids as determined by Test Procedure I.

Finally the calendered/length oriented film was microfibrillated as in Comparative Example C1 except that 11.7 MPa water pressure was used and the film was passed through the hydroentangler 6 times per side. The water and oil absorption of the resulting microfibrillated film was measured according to Test Procedure IV, and the results are shown in Table 1.

Example 3

A film was prepared by extruding a blend containing 99 weight % polypropylene homopolymer (Fina 3374X, available from Atofina Inc., Houston, Tex.) with 1 weight % NuWet™ 500 in a single screw extruder as in Comparative Example $C_1$, except that the extruder temperature profile was set to 204° C., 221° C., 232° C., and 243° C. The resulting cast film had a thickness of 1.08 mm, a width of 119 mm, a density of 0.91 gram/cm$^3$ by Test Procedure I.

The cast film was calendered and length oriented as described in Comparative Example C1, except that roll 3 had a surface speed of 5.49 m/min and roll 4 had a surface speed of 5.76 m/min. The resulting calendered/length oriented film was oriented to a draw ratio of 21.6:1 as determined by Test Procedure II. The oriented film had a thickness of 117 micrometers, a width of 540 mm, and a density of 0.80 gram/cm$^3$. The film was calculated to contain 12% voids as determined by Test Procedure I.

Finally the calendered/length oriented film was microfibrillated as in Comparative Example C1, except that approximately 11.7 MPa water pressure was used and the film was passed through the hydroentangler 7 times on each side. The water and oil absorption of the resulting microfibrillated film was measured according to Test Procedure IV, and the results are shown in Table 1.

Example 4

A film was prepared by extruding a blend containing 90 weight % polypropylene homopolymer (Fina 3374X, available from Atofina Inc., Houston, Tex.) with 10 weight % PEG-P20K in a single screw extruder as in Comparative Example C1, except that the extruder temperature profile was set to 188° C., 204° C., 216° C., and 227° C., the neck tube and die were maintained at 232° C., and in the three-roll stack the bottom roll was set to 170° C., and the middle roll was set to 190° C. The resulting cast film had a thickness of 1.40 mm, a width of 159 mm, a density of 0.91 gram/cm$^3$.

The cast film was calendered and length oriented as described in Comparative Example C1, except that the cast film was fed from an unwind station at a rate of 0.14 m/min, roll 3 had a surface speed of 2.85 m/min, and roll 4 had a surface speed of 2.85 m/min. The resulting calendered/length oriented film was oriented to a draw ratio of 20.3:1 as determined by Test Procedure II. Note that this film was not stretched to breakage. The oriented film had a thickness of 181 micrometers, a width of 505 mm, and a density of 0.86 gram/cm³. The film was calculated to contain 5% voids as determined by Test Procedure I.

Finally the calendered/length oriented film was microfibrillated as in Comparative Example C1, but using approximately 13.8 Mpa water pressure and passing the film through the hydroentangler 20 times on each side. The water and oil absorption of the resulting microfibrillated film was measured according to Test Procedure IV, and the results are shown in Table 1.

Example 5

A film was prepared by extruding a blend containing 80 weight % polypropylene homopolymer (Fina 3374X, available from Atofina Inc., Houston, Tex.) with 20 weight % PEG-P20K in a single screw extruder as in Example 4. The resulting cast film had a thickness of 1.40 mm, a width of 159 mm, a density of 0.92 gram/cm³ by Test Procedure 1.

The cast film was calendered and length oriented as described in Example 4. The resulting calendered/length oriented film was oriented to a draw ratio of 20.3:1 as determined by Test Procedure II. The oriented film had a thickness of 151 micrometers, a width of 610 mm, and a density of 0.93 gram/cm³. The film was calculated to contain no voids as determined by Test Procedure I. However, the film did appear cloudy or voided.

Finally the calendered/length oriented film was microfibrillated as in Comparative Example C1, but using approximately 13.8 MPa water pressure and passing the film through the hydroentangler 12 times on each side. The water and oil absorption of the resulting microfibrillated film was measured according to Test Procedure IV, and the results are shown in Table 1.

Example 6

A film was prepared by extruding a blend containing 96 weight % polypropylene homopolymer (Fina 3374X, available from Atofina Inc., Houston, Tex.), 1.2 weight % sorbitan monolaurate, and 2.8 weight % glycerol monolaurate in a single screw extruder as in Comparative Example C1, except for the following distinctions. The extruder temperature profile was set to 210° C., 226° C., 238° C., and 249° C., and the neck tube and die were maintained at 249° C. In the three-roll stack, the bottom roll was set to 210° C., the middle roll was set to 210° C., and the top silicon rubber roll was cooled with 100° C. water. The cast film had a thickness of 1.18 mm, a width of 112 mm, a density of 0.91 grams/cm³.

The cast film was fed from an unwind station into the compressive nip of a first calender (two rolls) at a surface speed of 1.22 m/min, a temperature of 121° C., and a pressure of 3.45 MPa. The film exiting the first calender was fed into a second and third pulling calender set (two rolls in each set) operating at as high a surface speed as possible without breaking the film. The resulting oriented and voided film was wound onto a core under tension. The films were oriented to a draw ratio of 13.5:1 as determined by Test Procedure III, had a thickness of 138 micrometers, a width of 140 mm, and contained 10.8% voids as determined by Test Procedure I.

Finally the calendered/length oriented film was microfibrillated as in Comparative Example C1, except that approximately 11.7 Mpa water pressure was used, and the film was passed through the hydroentangler 6 times per side. The water and oil absorption of the resulting microfibrillated film was measured according to Test Procedure IV, and the results are shown in Table 1.

Example 7

A film was prepared by extruding a blend containing 90 weight % polypropylene homopolymer (Fina 3374X, available from Atofina Inc., Houston, Tex.) and 10 weight % of an extrudable, water swellable blend in a single screw extruder as in Comparative Example C1, except that the extruder temperature profile was set to 210° C., 226° C., 238° C., and 246° C., the neck tube and die were maintained at 246° C., and in the three-roll stack, the bottom roll was set to 210° C., and the top silicon rubber roll was cooled with 100° C. water. The extrudable, water swellable blend consisted of the following in weight percent:

57% polyvinylpyrrolidone

24% Surlyn 1705

14% Pycal 94

3% MBX-50

2% Irganox 1010

The resulting cast film had a thickness of 1.27 mm, a width of 124 mm, a density of 0.91 grams/cm³ as determined by Test Procedure I.

In the same calender used in Example 6, the cast film was fed from an unwind station into the compressive nip of a first calender (two rolls) at a surface speed of 1.22 m/min, a temperature of 154° C., and a pressure of 2.76 MPa. The film exiting the first calender was fed into a second and third pulling calender set (two rolls in each set) operating at as high a surface speed as possible without breaking the film. The resulting oriented and voided film was wound onto a core under tension. The films were oriented to a draw ratio of 14.6:1 as determined by Test Procedure III, had a thickness of 119 micrometers, a width of 99 mm, and contained 5.5% voids as determined by Test Procedure I.

Finally the calendered/length oriented film was microfibrillated as in Comparative Example C1, however using approximately 12.4 MPa water pressure and passing the film through the hydroentangler 12 times per side. The water and oil absorption of the resulting microfibrillated film was measured according to Test Procedure IV, and the results are shown in Table 1.

Example 8

Preparation of Sulfonated Polyester:

A one-gallon stainless steel reactor equipped with an agitator, thermocouple, nitrogen inlet, column, and solvent take-off condenser was charged with dimethyl-5-sodiosulfoisophthalate (DMSSIP, 117.6 g, 0.397 mol, available from E. I. DuPont de Nemours, Wilmington, Del.), dimethyl terephthalate, 1228 g, 6.32 mol, available from U.S. Chemicals, Inc., New Canaan, Conn.), ethylene glycol (914 g, 14.7 mol, available from Dow Chemical Co., Midland, Mich.), Carbowax™ polyethylene glycol 8000 (196 g, 24.5 mmol, available from Dow Chemical Co.), zinc acetate (0.67 g, 3.6 mmol, available from Aldrich Chemical Co., Milwaukee, Wis.), and antimony trioxide (0.55 g, 1.9 mmol, available from Aldrich). The reactor was pressurized with nitrogen to 138 kPa (20 psi), kept under a slow sweep of nitrogen, stirred, and heated to 190° C. until the evolution of methanol stopped (about 2 hours). The pressure was then reduced to atmospheric pressure and triethyl phosphonoacetate (0.82 g, 3.6 mmol, available from Aldrich) was added to the reaction mixture. The temperature of the reaction mixture was then raised to 265° C. and a vacuum was applied to distill excess ethylene glycol from the reactor.

After about 45 minutes at 265° C. and a pressure of about 1 mm, nitrogen was admitted to the system and the polymeric product was drained from the reactor. The polymer was found to have an inherent viscosity of 0.484 dL/g at a concentration of 0.40 g/dL in a mixture of phenol/ortho-dichlorobenzene (60/40 by weight) and a melting point of 204° C.

Preparation of Fibrillated Film:

A film was prepared by extruding a blend containing 80 weight % polypropylene homopolymer (Fina 3374X, available from Atofina Inc., Houston, Tex.) and 20 weight % of the sulfonated polyester in a single screw extruder as in Comparative Example C1, except that the extruder temperature profile was set to 204° C., 208° C., 213° C., and 215° C, the neck tube and die were maintained at 215° C., and in the three-roll stack the bottom roll was set to 32° C., the middle roll was set to 32° C., and the top silicon rubber roll was cooled with 21° C. water. The cast film had a thickness of 1.27 mm, a width of 127 mm, a density of 0.96 grams/cm³ by Test Procedure I.

In the same calender used in Example 6, the cast film was fed from an unwind station into the compressive nip of a first calender (two rolls) at a surface speed of 1.22 m/min, a temperature of 137° C., and a pressure of 3.45 MPa. The film exiting the first calender was fed into a second and third pulling calender set (two rolls in each set) operating at as high a surface speed as possible without breaking the film. The resulting calendered/length oriented and voided film was wound onto a core under tension. The films were oriented to a draw ratio of 9.2:1 as determined by Test Procedure III, had a thickness of 211 micrometers, a width of 89 mm, and contained 6.2% voids as determined by Test Procedure I.

Finally the calendered/length oriented film was microfibrillated as in Comparative Example C1, however using approximately 9.7 MPa water pressure and passing the film through the hydroentangler 4 times per side. The water and oil absorption of the resulting microfibrillated film was measured according to Test Procedure IV, and the results are shown in Table 1.

Example 9

A film was prepared by extruding a blend containing 70 weight % polypropylene homopolymer (Fina 3374X, available from Atofina Inc., Houston, Tex.) and 30 weight % of the sulfonated polyester of Example 8 in a single screw extruder as in Comparative Example C1, except that the extruder temperature profile was set to 203° C., 209° C., 213° C, and 213° C., the neck tube and die were maintained at 213° C., and in the three-roll stack, the bottom roll was set to 21° C., the middle roll was set to 21° C., and the top silicon rubber roll was cooled with 21° C. water. The resulting cast film had a thickness of 1.27 mm, a width of 124 mm, a density of 0.98 grams/cm³ by Test Procedure I.

In the same calender used in Example 6, the cast film was fed from an unwind station into the compressive nip of a first calender (two rolls) at a surface speed of 1.22 m/min, a temperature of 132° C., and a pressure of 3.45 MPa. The film exiting the first calender was fed into a second and third pulling calender set (two rolls in each set) operating at as high a surface speed as possible without breaking the film. The resulting calendered/length oriented and voided film was wound onto a core under tension. The films were oriented to a draw ratio of 7.9:1 as determined by Test Procedure III, had a thickness of 203 micrometers, a width of 104 mm, and contained 5.7% voids as determined by Test Procedure I.

Finally the calendered/length oriented film was fibrillated as in Comparative Example C1, however using approximately 8.3 MPa water pressure and passing the film through the hydroentangler 3 times per side. The water and oil absorption of the resulting microfibrillated film was measured according to Test Procedure IV, and the results are shown in Table 1.

TABLE 1

Water and Oil Absorption of Various Microfibrillated Polypropylene Based Films.

| Example | Dry Weight of Microfibrillated Film (grams) | Total Water Absorption | Water Retention | Total Oil Absorption | Oil Retention |
|---------|---------|---------|---------|---------|---------|
| C1 | 0.76 | 0.35 | 0.30 | 17.46 | 13.55 |
| 1  | 0.74 | 3.90 | 1.75 | 16.79 | 12.64 |
| 2  | 0.73 | 1.46 | 1.34 | 18.04 | 13.79 |
| 3  | 0.85 | 0.71 | 0.54 | 17.66 | 12.58 |
| 4  | 1.55 | 1.44 | 1.09 | 11.36 | 6.40  |
| 5  | 1.01 | 1.96 | 1.66 | 19.42 | 10.83 |
| 6  | 0.92 | 1.59 | 1.81 | 15.59 | 11.57 |
| 7  | 0.98 | 2.15 | 1.21 | 17.70 | 13.06 |
| 8  | 1.07 | 2.04 | 1.32 | 15.82 | 12.32 |
| 9  | 1.35 | 2.25 | 1.24 | 15.64 | 12.39 |

Table 1 shows that the total water absorption and water retention were significantly greater in all Examples than in Comparative Example C1. These results show the benefits of adding hydrophilic components to the polymer melt, in order to create hydrophilic polypropylene micro-fibers. Surprisingly, cast films containing the hydrophilic components were found to orient to high draw ratios and to microfibrillate by water jets without washing out the hydrophilic components. Additionally, the similar oil absorptions found for all of the microfibrillated films showed that the lower water absorption of Comparative Example C1 film was not due to a lower extent of microfibrillation than in the Example films.

Comparative Example C2

A polyethylene film was prepared by extruding high density polyethylene homopolymer (Alathon M6020, available from Equistar Chemicals, Houston, Tex.) in a single screw extruder as in Comparative Example C1, except that the extruder temperature profile was set to 188° C., 210° C., 216° C., and 227° C., and the neck tube and die were maintained at 227° C. The resulting cast film had a thickness of 1.22 mm, a width of 130 mm, and a density of 0.96 gram/cm³ by Test Procedure I.

The cast film was calendered and length oriented as described in Comparative Example C1, except that the cast film was fed from the unwind station at a rate of 0.24 m/min, rolls 1 and 2 each had surface speed of 0.91 m/min and a temperature of 70° C., roll 3 had a surface speed of 3.20 m/min and a temperature of 100° C., and roll 4 had a surface speed of 6.72 m/min and a temperature of 100° C. The resulting calendered/length oriented film was oriented to a draw ratio of 28.5:1 as determined by Test Procedure II. The oriented film had a thickness of 96 micrometers, and a density of 0.90 gram/cm³. The film was calculated to contain 6% voids as determined by Test Procedure I.

Finally the calendered/length oriented film was fibrillated as in Comparative Example C1, however using approximately 13.1 MPa water pressure and passing the film through the hydroentangler 6 times per side. The water and oil absorption of the resulting fibrillated film was measured according to Test Procedure IV, and the results are shown in Table 2.

Example 10

A film was prepared by extruding blend containing 95 weight-% high density polyethylene homopolymer (Alathon M6020, available from Equistar Chemicals, Houston, Tex.), and 5 weight % of an extrudable, water swellable blend in a single screw extruder as in Comparative Example C2. The extrudable, water swellable blend consisted of the following in weight percent:

57% polyvinylpyrrolidone
24% Surlyn 1705
14% Pycal 94
3% MBX-50
2% Irganox 1010

The resulting cast film had a thickness of 1.22 mm, a width of 130 mm, a density of 0.97 gram/cm³ by Test Procedure I.

The cast film was calendered and length oriented as described in Comparative Example C1, except that the cast film was fed from an unwind station at a rate of 0.29 n/min, rolls 1 and 2 each had a surface speed of 0.91 m/min and a temperature of 70° C., roll 3 had a surface speed of 3.66 m/min and a temperature of 100° C., and roll 4 had a surface speed of 7.68 m/min and a temperature of 100° C. The resulting film was calendered/length oriented to a draw ratio of 26.3:1 as determined by Test Procedure II. The oriented film had a thickness of 117 micrometers, and a density of 0.94 gram/cm³. The film was calculated to contain 3% voids as determined by Test Procedure I.

Finally the calendered/length oriented film was microfibrillated as in Comparative Example C1, however using approximately 11.7 MPa water pressure and passing the film through the hydroentangler 7 times per side. The water and oil absorption of the resulting fibrillated film was measured according to Test Procedure IV, and the results are shown in Table 2.

Example 11

A film was prepared by extruding a blend containing 90 weight % high density polyethylene homopolymer (Alathon M6020, available from Equistar Chemicals, Houston, Tex.), and 10 weight % of an extrudable, water swellable blend in a single screw extruder as in Example 10. The extrudable, water swellable blend consisted of the following in weight percent:

57% polyvinylpyrrolidone
24% Surlyn 1705
14% Pycal 94
3% MBX-50
2% Irganox 1010

The resulting cast film had a thickness of 1.22 mm, a width of 130 mm, and a density of 0.98 gram/cm³ by Test Procedure I.

The cast film was calendered and length oriented as in Comparative Example C1, except that rolls 1 and 2 each had surface speed of 0.91 m/min and a temperature of 70° C, roll 3 had a surface speed of 3.66 m/min and a temperature of 100° C., and roll 4 had a surface speed of 10.97 m/min and a temperature of 100° C. The resulting calendered/length oriented film was oriented to a draw ratio of 39.9:1 as determined by Test Procedure II. Note that the film may have slipped over some of the rolls. The oriented film had a thickness of 116 micrometers, and a density of 0.98 gram/cm³. The film was calculated to contain no voids as determined by Test Procedure I.

Finally the calendered/length oriented film was microfibrillated as in Comparative Example C1, however using approximately 11.7 MPa water pressure and passing the film through the hydroentangler 6 times per side. The water and oil absorption of the resulting fibrillated film was measured according to Test Procedure IV, and the results are shown in Table 2.

Example 12

A film was prepared by extruding a blend containing 80 weight % high density polyethylene homopolymer (Alathon M6020, available from Equistar Chemicals, Houston, Tex.), 17 weight % polypropylene homopolymer (Fina PP3445, available from Atofina Inc., Houston Tex.), and 3 weight % FCS-1 in a single screw extruder as in Comparative Example C2. The cast film had a thickness of 1.22 mm, a width of 130 mm, and a density of 0.95 gram/cm³ by Test Procedure 1.

The cast film was calendered and length oriented as in Comparative Example C1, except that the cast film was fed from an unwind station at a rate of 0.40 m/min, rolls 1 and 2 each had surface speed of 0.91 m/min and a temperature of 70° C., roll 3 had a surface speed of 3.66 m/min and a temperature of 100° C., and roll 4 had a surface speed of 10.24 m/min and a temperature of 100° C. The resulting film was oriented to a draw ratio of 25.7:1 as determined by Test Procedure II. Note that the film may have slipped over some of the rolls. The oriented film had a thickness of 160 micrometers, and a density of 0.86 gram/cm³. The film was calculated to contain 9% voids as determined by Test Procedure I.

Finally the calendered/length oriented film was microfibrillated as in Comparative Example C1, however using approximately 13.2 MPa water pressure and passing the film through the hydroentangler 4 times per side. The water and oil absorption of the resulting microfibrillated film was measured according to Test Procedure IV, and the results are shown in Table 2.

Example 13

A film was prepared by extruding a blend containing 90 weight % high density polyethylene homopolymer (Alathon M6020, available from Equistar Chemicals, Houston, Tex.) with 10 weight % PEG-P20K in a single screw extruder as in Comparative Example C1, except that the extruder temperature profile was set to 171° C., 193° C., 204° C., and 216° C., the neck tube and die were maintained at 216° C., and in the three-roll stack the bottom roll was set to 170° C., and the middle roll was set to 190° C. The thickness, width and density of the cast film were not measured.

The cast film was calendered and length oriented as described in Comparative Example C1, except that the cast film was fed from an unwind station at a rate of approximately 0.2 m/min, rolls 1 and 2 each had a surface speed of 0.91 m/min and a temperature of 70° C., roll 3 had a surface speed of 2.29 m/min and a temperature of 100° C, and roll 4 had a surface speed of 2.29 m/min and a temperature of 100° C. The resulting calendered/length oriented film was oriented to a draw ratio of 11.4:1 as determined by Test Procedure II. The oriented film had a thickness of 158 micrometers, and a density of 0.99 gram/cm³. The void content of the oriented film was not calculated.

Finally the calendered/length oriented film was microfibrillated as in Comparative Example C1, however using approximately 13.1 MPa water pressure and passing the film through the hydroentangler 4 times per side. The water and oil absorption of the resulting microfibrillated film was measured according to Test Procedure IV, and the results are shown in Table 2.

Ampacet Co., Cincinnati, Ohio) was prepared in a 63 mm single screw extruder (available from Davis-Standard Corp., Cedar Grove, N.J.) equipped with a Saxton single stage screw at 50 rpm and a temperature profile from 138° C. to 246° C. to 149° C. The exit melt temperature was 133° C., creating an exit pressure of 10.34 MPa. The melt mixture was extruded into the core of a 25.4 cm 3-layer vane die at 182° C. A 28 mm Davis Standard single screw extruder at 20 rpm was used to feed two skin layers of conventional polypropylene (Fina PP3445, available from Atofina Inc., Houston, Tex.) into the die.

The resulting foam sheet was cooled on a chrome cast roll at 16.7° C. and then collected at a draw rate of 5.1 m/min. The foam had a density of 0.46 g/cc at a thickness of 1.27 mm. This foam was oriented using a length orienter (LO) (available from Killian, a division of Davis-Standard Corp., Cedar Grove, N.J.) and tenter (available from Bruckner, France) at a draw ratio of 3.0 in the machine direction (MD) and 3.5 in the transverse direction (TD). The temperature of the LO rolls was 135° C. and the tenter zones were all 166° C. The foam entered the LO at 1.52 m/min. The density of the resulting biaxially oriented foam was 0.30 g/cc, with a thickness of 114 micrometers.

Finally, the biaxially oriented foam was microfibrillated on both major surfaces in a hydroentangler (Hydrolace 350, available from CEL International, England) using 15 MPa water pressure, with the foam going through at 5 m/min.

TABLE 2

Water and Oil Absorption of Microfibrillated Polyethylene Based Films.

| Example | Dry Weight of Microfibrillated Film (grams) | Total Water Absorption | Water Retention | Total Oil Absorption | Oil Retention |
|---|---|---|---|---|---|
| C2 | 0.96 | 1.49 | 1.17 | 12.47 | 6.07 |
| 10 | 1.07 | 2.00 | 0.90 | 12.20 | 5.28 |
| 11 | 1.00 | 2.07 | 1.09 | 9.52 | 4.58 |
| 12 | 1.63 | 1.27 | 1.23 | 15.72 | 9.90 |
| 13 | 0.99 | 3.70 | 1.57 | 12.69 | 7.36 |

Table 2 shows that the total water absorption was significantly greater in Examples 10, 11, and 13 than that in Comparative Example C2. These results show that hydrophilic polyethylene fibers can be achieved by adding hydrophilic components to the polymer melt, casting a film, orienting the film, and micro fibrillating the film. Surprisingly, the cast films containing the hydrophilic components were found to orient to high draw ratios and to fibrillate by water jets without washing out the hydrophilic components. Additionally, the similar oil absorptions found for each of the fibrillated films shows that the lower water absorption of Comparative Example C2 was not caused by a lower extent of fibrillation than that of the fibrillated films of Examples 10–13.

Comparative Example C3

A melt mixture of 34.2% high melt strength polypropylene (Profax® PF814, available from Basell Polyolefins Company, Lansing, Mich.), 34.2% conventional polypropylene (Fina PP3376, available from Atofina Inc., Houston, Tex.), 29.2% polyethylene elastomeric copolymer (Affinity 8200, available from Dow Chemical, Midland, Mich.), and 2.4% by weight of FM1307H™ chemical blowing agent (50% azodicarbonamide loaded in PE, available from Each side was passed under 3–4 water jet strips (each strip being 50 cm wide, with 11–20 holes/cm, each hole having a diameter in the range of 100–150 microns). The water and oil absorption of the resulting microfibrillated foam was measured according to Test Procedure IV, and the results are shown in Table 3.

These biaxially microfibrillated foams were comprised mostly of microflakes in schistose structures with an average effective thickness of 1 to 20 micrometers, most less than 5 micrometers; and an average width of 1 to 100s of micrometers, most from about 5 to 20 microns.

Example 14

A melt mixture of 35.2 weight % Profax™ PF814, 8% Fina PP3376, 22.1% Fina PP3445, 29.2 weight % Affinity 8200, 2.7 weight % of Dimodan ML-90, 1.2 weight % sorbitan monolaurate, and 1.6 weight % of FM1307H™ chemical blowing agent (50% azodicarbonamide loaded in PE) was prepared in a 63 mm single screw extruder (Davis-Standard) equipped with a Saxton single stage screw at 60 rpm and a temperature profile from 138° C. to 232° C. to 148° C. The exit melt temperature was 131° C., creating an exit pressure of 13.8 MPa. The melt mixture was extruded into the core of a 25.4 cm 3-layer vane die at 182° C. A 28 mm Davis Standard single screw extruder at 140 rpm was used to feed into the die two skin layers of conventional polypropylene (Fina PP3155, available from Atofina in Houston, Tex.). The resulting foam sheet was cooled on a chrome cast roll at 15.6° C. and then collected at a draw rate of 4.05 m/min. The foam had a density of 0.63 g/cc at a thickness of 1.14 mm.

This foam was oriented using an LO and tenter at a draw ratio of 3.25 (MD)×4.5 (TD). The temperature of the LO rolls was 130° C. and the tenter zones were all 166° C. The foam entered the LO at 1.52 m/min. The density of the resulting foam was 0.46 g/cc, with a thickness of 127 micrometers.

Finally, the biaxially oriented foam was microfibrillated as in Comparative Example C3. The water and oil absorption of the resulting fibrillated foam, along with the rate of water absorption were measured according to Test Procedures IV and V respectively, and the results are shown in Table 3.

TABLE 3

Water and Oil Absorption & Rate of Water Absorption of Microfibrillated Polypropylene Based Foams.

| Example | Dry Weight of Fibrillated Foam (grams) | Total Water Absorption | Water Retention | Total Oil Absorption | Oil Retention | Average Rate of Water Absorption (seconds/cm) |
|---|---|---|---|---|---|---|
| C3 | 1.11 | 4.80 | 2.51 | 17.64 | 10.03 | Does not absorb water |
| 14 | 1.67 | 5.04 | 3.37 | 16.07 | 6.27 | 33.5 |

Table 3 shows that the total water absorption and water retention was lower in Comparative Example C3 than in Example 14. More importantly, while the microfibrillated foam of Example 14 absorbed water at a significant rate, the microfibrillated foam of Comparative Example C3 did not absorb water at a measurable rate. These results show that hydrophilic polypropylene-based fibers and flakes were achieved by adding hydrophilic components to the polymer melt, casting a foam, orienting the foam, and microfibrillating the foam. Surprisingly, the oriented foam containing the hydrophilic component was found to microfibrillate by water jets without washing out the hydrophilic component. Additionally, the higher oil absorption of Comparative Example C3 indicated that this foam was microfibrillated to a greater extent than that of Example 14, and yet had a lower water absorption. Since an increased extent of microfibrillation would be expected to result in increased water absorption, the above results showed even more conclusively that the hydrophilic nature of the foam of Example 14 caused its water absorption to exceed that of Comparative Example C3.

Comparative Example C4

A 75 g batch of 40 wt % polypropylene homopolymer (Fina 3376 available from Atofina Inc., Houston, Tex.) with 40 wt % calcium metasilicate (wollastonite grade 800H available from Fibertec Inc., Bridgewater, Mass.) and 20 wt % styrenic block copolymer (Vector 4114 available from Dexco Polymers, Plaquemine, La.) was compounded at 180 C in a Plasti-Corder Laboratory batch mixer (type DR-2051, manufactured by C. W. Brabender Instruments, Inc., South Hackensack, N.J.) for 3 min at 70 rpm. The resulting mixture was then pressed into a sheet between metal platens, using a 0.036 inch spacer shim, in a hot press (model G-30H-1S-LP manufactured by Wabash MPI, Wabash, Ind.) at 200° C. under a load of 454 kg for 3 min, followed by pressing under a load of 18,160 kg for an additional 30 sec, and finally quenched between cold clamps cooled with running tap water for 3 min. The density of the resulting pressed sheet was 1.27 g/cm³. From the pressed sheet, 85 mm×85 mm square specimens were cut out and biaxially oriented in a Karo IV Laboratory Stretcher (manufactured by Brückner Maschinenbau GmbH, Siegsdorf, Germany) at 148° C. A simultaneous balanced stretch at 4.2 m/min in both the machine direction (MD) and the transverse direction (TD) was employed, resulting in a final biaxial draw ratio of 3.5×3.5 (MD×TD). The resulting oriented film had a thickness of approximately 0.20 mm and a density of 0.67 g/cm³, indicating a void content of 47.2%.

The oriented film was exposed to an array of high pressure water jets using a lab scale hydroentangler (70 cm wide, S/N 101, Project# 2303: manufactured by Honeycomb Systems Inc., Biddeford, Me.) operating at approximately 7 MPa water pressure. The water jet orifices were 110 micrometers in diameter, with 15.75 orifices/cm. The oriented film was taped onto a solid plastic sheet that was transported by a conveyor belt moving 6 m/min perpendicularly beneath the array of water jets. The oriented film was passed four times beneath the water jets and exposed on one side only. The film was allowed to air dry after the hydroblasting process. The water and oil absorption of the resulting microfibrillated film were measured according to Test Procedure IV, and the results are shown in Table 4.

Example 15

A 75 g batch of 40 wt % polypropylene homopolymer (Fina 3376 available from Atofina Inc., Houston, Tex.) with 40 wt % calcium metasilicate (wollastonite grade 800H available from Fibertec Inc., Bridgewater, Mass.), 15 wt % styrenic block copolymer (Vector 4114 available from Dexco Polymers, Plaquemine, La.), and 5 wt % of glycerol monolaurate (Lauricidin™, available from Med-Chem Laboratories, East Lansing, Mich.) was compounded, pressed into sheet form, and biaxially oriented into a thin (0.20 mm) film in exactly the same manner as described in Comparative Example C4. The density of the pressed sheet was 1.23 g/cm³, and the density of the oriented film was 0.63 g/cm³, indicating a void content of 48.8%.

The oriented film was hydroblasted in an identical fashion to that described in Comparative Example C4. The film was allowed to air dry after the hydroblasting process, and then placed in an oven at 60° C. for 7 hours. The water and oil absorption of the resulting microfibrillated film were measured according to Test Procedure IV, and the results are shown in Table 4.

TABLE 4

Water and Oil Absorption of Microfibrillated Biaxially Oriented Film.

| Example | Dry Weight of Microfibrillated Film (grams) | Total Water Absorption | Water Retention | Total Oil Absorption | Oil Retention |
|---------|---------|---------|---------|---------|---------|
| C4 | 5.33 | 1.62 | 0.43 | 7.49 | 2.56 |
| 15 | 2.93 | 5.20 | 2.54 | 8.83 | 4.10 |

Table 4 shows that the total water absorption and water retention were significantly greater in Example 15 than that in Comparative Example C4. These results show that hydrophilic polypropylene based microflakes were generated by adding hydrophilic components to the polymer melt, casting a film, biaxially orienting the film, and microfibrillating the film. Surprisingly, the cast film containing the hydrophilic component was found to orient and to microfibrillate by water jets without washing out the hydrophilic component. Additionally, the similar oil absorptions found for both of the microfibrillated films (Example 15 and Comparative Example C4) showed that the lower water absorption of Comparative Example C4 was not caused by a lower extent of fibrillation than that of the fibrillated film of Examples 15.

We claim:

1. A hydrophilic microfibrillated article comprising oriented melt-processed polymeric material, the polymeric material comprising
   melt-processed polymer selected from the group consisting of polypropylene, polyethylene, and mixtures thereof, and
   hydrophilic component in an amount effective to improve the hydrophilicity of the microfibrillated article.

2. The article of claim 1 wherein the article exhibits water absorption in the range from about 1.5 to about 10 grams water per gram article.

3. The article of claim 1 wherein the melt-processed polymer comprises a polyethylene homopolymer or a polypropylene homopolymer.

4. The article of claim 1 wherein the article has a total water absorption at least 30 percent greater than a microfibrillated article prepared identically except without the hydrophilic component.

5. The article of claim 1 wherein the hydrophilic component comprises a hydrophilic polymer selected from the group consisting of a homo- and copolymers of polyvinylpyrrolidone, a sulfonated polyester, a poly(ethylene oxide), a (meth)acrylic acid, ionomer copolymers of ethylene and acrylic acid mixtures thereof.

6. The article of claim 1 wherein the hydrophilic component comprises a hydrophilic polymer selected from the group consisting of a polyvinylpyrrolidone, a blend of polyvinylpyrrolidone and an ionomer copolymer of ethylene and acrylic or methacrylic acid, a sulfonated polyester, and mixtures thereof.

7. The article of claim 1 comprising from about 10 to about 70 parts by weight hydrophilic polymer.

8. The article of claim 1 wherein the hydrophilic component comprises hydrophilic surfactant.

9. The article of claim 8 wherein the polymeric material comprises from about 1 to about 5 puts by weight hydrophilic surfactant per 100 parts by weight melt-processable polymer.

10. The article of claim 8 wherein the hydrophilic surfactant comprises nonionic surfactant.

11. The article of claim 8 wherein the hydrophilic surfactant comprises a C8 to C16 fatty acid monoglyceride.

12. The article of claim 8 wherein the hydrophilic surfactant is selected from the group consisting of glycerol monolaurate and sorbitan monolaurate.

13. The article of claim 8 wherein the hydrophilic surfactant is selected from the group consisting of a glycerol monoester and an anhydrosorbitol monoester.

14. The article of claim 8 wherein the hydrophilic surfactant comprises fluoroaliphatic group-containing nonionic surfactant having one or more polyoxyalkylene group, and having the formula:

wherein $R_f$ is a fluoroaliphatic group having at least 4 filly-fluorinated carbon atoms that may be straight-chained, branched, or if sufficiently large, cyclic, or any combination thereof, the backbone of which may include one or more catenary heteroatom bonded only to carbon atoms of the backbone, wherein Q is a multivalent linking group that may comprise a heteroatom-containing group, a covalent bond, or a combination thereof, wherein Z is a nonionic water-solubilizing group comprising a poly(oxyalkylene) group, $(OR')_x$ where R' is an alkylene group having from 2 to about 4 carbon atoms and x is a number between about 6 and about 20, and wherein n is a number from 1 to 6.

15. The article of claim 8 wherein the hydrophilic surfactant comprises a nonionic, non-fluorinated, polyoxyethylene group-containing surfactants according to the formula:

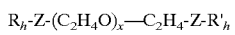

wherein $R_h$ is an alkyl, aryl, or alkaryl group that may be substituted or unsubstituted and that contains from 2 to about 20 carbon atoms whose skeletal chain may be straight-chained, branched, or, if sufficiently large, cyclic, or any combination thereof, and can optionally include one or more heteroatoms bonded to the carbon atoms of the skeletal chain, wherein $R_h'$ is a hydrogen atom, an alkyl group, an aryl group, or a combination thereof that may be substituted or unsubstituted and that contains from 2 to about 20 carbon atoms whose skeletal chain may be straight-chained, branched, or, if sufficiently large, cyclic, or any combination thereof, and can optionally include one or more heteroatoms bonded to the carbon atoms of the skeletal chain, wherein one or both of $R_h$ and $R_h'$ may contain a polydialkylsiloxane group of the formula R—(SiR$_2$O)$_n$—SiR$_2$— wherein each R group is independently an alkyl or aryl group having from 2 to about 10 carbon atoms, that may be substituted or unsubstituted, straight-chained or branched, cyclic or acyclic, and may contain one or more heteroatoms, n=2 to 20, Z is an —O—, —S—, —CO—, —C(O)O—, —NH—, —CONH—, or —N(R)— where R is a substituted or unsubstituted alkyl, cycloalkyl, or aryl group having from 1 to 10 carbon atoms that may contain heteroatoms such as oxygen, sulfur, or nitrogen, and may contain one or more ethylene oxide groups.

16. The article of claim 8 wherein the hydrophilic surfactant comprises fluorochemical surfactant and non-fluorochemical surfactant.

17. The article of claim 1 comprising microfibers having an effective diameter less than 20 microns and a transverse aspect ratio from 1.5:1 to 20:1.

18. The article of claim 1 comprising microflakes having dimensions in two dimensions that are at least 10 times a third dimension of the microflake.

19. The article of claim 1 wherein the microfibrillated article comprises a cloth-like material selected from the group consisting of a water-absorbing wipe, a mop, a mat, a cloth, a fabric, and a tape backing.

20. A hydrophilic microfibrillated article comprising oriented, melt-processed polymeric material, the polymeric material comprising high melt strength polypropylene and hydrophilic component.

21. The article of claim 20 wherein the melt-processed polymer comprises branched polypropylene.

22. The article of claim 20 comprising a voiding agent.

23. The article of claim 20 wherein the hydrophilic component comprises a hydrophilic polymer selected from the group consisting of a polyvinylpyrrolidone, a sulfonated polyester, a poly(ethylene oxide), and mixtures thereof.

24. A hydrophilic microfibrillated article comprising oriented melt-processed polymeric material, the polymeric material comprising melt-processed polymer and hydrophilic surfactant.

25. The article of claim 24 wherein the surfactant Comprises nonionic surfactant.

26. The article of claim 24 wherein the hydrophilic surfactant is selected from the group consisting of a C8 to C16 fatty acid monoglyceride;

a fatty acid ester of anhydrosorbitol or a polyoxyethylene derivative thereof;

fluoroaliphatic group-containing nonionic surfactant having one or more polyoxyalkylene group, and having the formula:

(R$_f$-Q)$_n$-Z wherein R$_f$ is a fluoroaliphatic group having at least 4 fully-fluorinated carbon atoms that may be straight-chained, branched, or if sufficiently large, cyclic, or any combination thereof, the backbone of which may include one or more catenary heteroatom bonded only to carbon atoms of the backbone, wherein Q is a multivalent linking group that may comprise a heteroatom-containing group, a covalent bond, or a combination thereof, wherein Z is a nononic water-solubilizing group comprising a poly(oxyalkylene) group, (OR')$_x$ whore R' is an alkylene group having from 2 to about 4 carbon atoms and x is a number between about 6 and about 20, and wherein n is a number from 1 to 6;

nonionic, non-fluorinated, polyoxyethylene group-containing surfactant according to the formula:

R$_h$-Z-(C$_2$H$_4$O)$_x$—C$_2$H$_4$-Z-R$_h$' wherein R$_h$ is an alkyl, aryl, or alkaryl group that may be substituted or unsubstituted and that contains from 2 to about 20 carbon atoms whose skeletal chain may be straight-chained, branched, or, if sufficiently large, cyclic, or any combination thereof and can optionally include one or more heteroatoms bonded to the carbon atoms of the skeletal chain, wherein R$_h$' is a hydrogen atom, an alkyl group, an aryl group, or a combination thereof that may be substituted or unsubstituted and that contains from 2 to about 20 carbon atoms whose skeletal chain may be straight-chained, branched, or, if sufficiently large, cyclic or any combination thereof, and can optionally include one or more heteroatoms bonded to the carbon atoms of the skeletal chain, wherein one or both of R$_h$ and R$_h$' may contain a polydialkylsiloxane group of the formula R—(SiR$_2$O)$_n$—SiR$_2$— wherein each R group is independently an alkyl or aryl group having from 2 to about 10 carbon atoms, that may be substituted or unsubstituted, straight-chained or branched, cyclic or acyclic, and may contain one or more heteroatoms, n=2 to 20, Z is an —O—, —S—, —CO—, —C(O)O—, —NH—, —CONH—, or —N(R)— where R is a substituted or unsubstituted alkyl, cycloalkyl, or aryl group having from 1 to 10 carbon atoms that may contain heteroatoms such as oxygen, sulfur, or nitrogen, and may contain one or more ethylene oxide groups;

and mixtures thereof.

27. The article of claim 24 wherein the melt-processed polymer comprises a polymer selected from the group consisting of polypropylene, high density polypropylene, low density polypropylene, polyoxymethylene, poly (vinylidene fluoride), poly(methyl pentene), poly(ethylene-chlorotrifluoroethylene), poly(vinyl fluoride), poly(ethylene terephthalate), poly(butylenes terephthalate), nylon 6, nylon 66, polybutene, nylon 6,12, poly(lactic acid), thermotropic liquid crystal polymer, the class of aliphatic polyesters, and mixtures thereof.

* * * * *

UNITED STATES PATENT AND TRADEMARK OFFICE
CERTIFICATE OF CORRECTION

PATENT NO.     : 6,692,823 B2
DATED          : February 17, 2004
INVENTOR(S)    : Kody, Robert S.

It is certified that error appears in the above-identified patent and that said Letters Patent is hereby corrected as shown below:

Title page,
Item [54], Title, delete "HYDROPHILLIC" and insert -- HYDROPHILIC --.
Item [56], References Cited, FOREIGN PATENT DOCUMENTS, delete "WO71789" and insert -- WO   00/71789 --.

Column 20,
Line 58, delete "$_{7,2}CH_3$" and insert -- $_{7.2}CH_3$ --.

Column 21,
Line 21, delete "Test Procedure 1" and insert -- Test Procedure I --.

Column 23,
Line 45, delete "5.76 ml/min" and insert -- 5.76 m/min --.

Column 24,
Line 6, delete "5.49 ml/min" and insert -- 5.49 m/min --.

Column 25,
Line 19, delete "Test Procedure 1" and insert -- Test Procedure I --.

Column 29,
Line 45, delete "0.29 n/min" and insert -- 0.29 m/min --.

Column 30,
Line 42, delete "Test Procedure 1" and insert -- Test Procedure I --.

Column 33,
Lines 64-65, delete "180 C" and insert -- 180° C --.

Column 35,
Line 63, delete "puts" and insert -- parts --.

Column 36,
Line 27, delete "$(R_fQ)_n$-z" and insert -- $(R_f-Q)_n$-z --.
Line 30, delete "filly-fluorinated" and insert -- fully-fluorinated --.

Column 37,
Line 43, delete "Comprises" and insert -- comprises --.

UNITED STATES PATENT AND TRADEMARK OFFICE
CERTIFICATE OF CORRECTION

PATENT NO.    : 6,692,823 B2
DATED         : February 17, 2004
INVENTOR(S)   : Kody, Robert S.

It is certified that error appears in the above-identified patent and that said Letters Patent is hereby corrected as shown below:

<u>Column 38,</u>
Line 4, delete "nononic" and insert -- nonionic --.
Line 5, delete "whore" and insert -- where --.
Line 20, after "thereof" insert -- , --.
Line 27, after "cyclic" insert -- , --.
Line 55, delete "chlorotrifiuoroethylene" and insert -- chlorotrifluoroethylene --.

Signed and Sealed this

Fourteenth Day of March, 2006

JON W. DUDAS
*Director of the United States Patent and Trademark Office*